United States Patent
Agarwal

(10) Patent No.: US 8,675,634 B2
(45) Date of Patent: Mar. 18, 2014

(54) TERMINAL MEASUREMENT BASED SYNCHRONIZATION FOR MESH SATELLITE COMMUNICATIONS

(75) Inventor: Anil Agarwal, North Potomoc, MD (US)

(73) Assignee: ViaSat, Inc., Carlsbad, CA (US)

( * ) Notice: Subject to any disclaimer, the term of this patent is extended or adjusted under 35 U.S.C. 154(b) by 1013 days.

(21) Appl. No.: 12/574,064

(22) Filed: Oct. 6, 2009

(65) Prior Publication Data

US 2010/0085908 A1   Apr. 8, 2010

Related U.S. Application Data

(60) Provisional application No. 61/103,165, filed on Oct. 6, 2008.

(51) Int. Cl.
  *H04B 7/185* (2006.01)
  *H04J 3/06* (2006.01)
  *H04B 7/212* (2006.01)

(52) U.S. Cl.
  USPC ........... 370/350; 370/316; 370/324; 455/12.1

(58) Field of Classification Search
  USPC ........ 370/350, 316, 324, 355; 455/12.1, 13.1, 455/13.2, 13.3
  See application file for complete search history.

(56) References Cited

U.S. PATENT DOCUMENTS

| | | | |
|---|---|---|---|
| 5,402,424 A * | 3/1995 | Kou | 370/324 |
| 5,581,390 A | 12/1996 | Fielden et al. | |
| 5,790,939 A | 8/1998 | Malcolm | |
| 5,850,392 A * | 12/1998 | Wang et al. | 370/335 |
| 5,910,945 A * | 6/1999 | Garrison et al. | 370/324 |
| 6,084,864 A | 7/2000 | Liron | |
| 6,407,986 B1 * | 6/2002 | Dutta | 370/280 |
| 7,013,165 B2 * | 3/2006 | Yoon et al. | 455/561 |
| 7,215,652 B1 | 5/2007 | Foley et al. | |
| 7,505,428 B2 * | 3/2009 | Kimura | 370/328 |
| 7,574,224 B2 * | 8/2009 | Lane et al. | 455/502 |
| 7,675,879 B1 | 3/2010 | Gregory et al. | |
| 7,974,261 B2 * | 7/2011 | Lane et al. | 370/350 |
| 8,068,448 B1 | 11/2011 | Foley et al. | |
| 8,233,840 B2 | 7/2012 | Agarwal | |
| 2001/0002822 A1 * | 6/2001 | Watters et al. | 342/357.1 |
| 2001/0046841 A1 * | 11/2001 | Hart et al. | 455/12.1 |
| 2002/0027524 A1 * | 3/2002 | Pippin | 342/357.08 |

(Continued)

OTHER PUBLICATIONS

International Application No. PCT/US2009/059722, International Search Report mailed Jun. 15, 2010, 3 pages.

(Continued)

*Primary Examiner* — Ian N Moore
*Assistant Examiner* — Jenee Alexander
(74) *Attorney, Agent, or Firm* — Kilpatrick Townsend & Stockton LLP

(57) ABSTRACT

Methods, systems, and devices are described for synchronization in mesh satellite communications. The arrival time of the gateway signal may be used to set a start of receive frame time for a terminal. A received control signal from the gateway may then be used to set a start of transmit frame time for the user terminal. The distance between the satellite and the gateway may change. Ephemeris data, various collections of terminal measurements, or terminal sync bursts may be used to modify start of transmit frame or start of receive frame settings for the terminal or gateway.

23 Claims, 29 Drawing Sheets

(56) References Cited

U.S. PATENT DOCUMENTS

| | | | |
|---|---|---|---|
| 2002/0041251 A1* | 4/2002 | Yamaashi et al. | 342/357.01 |
| 2002/0061730 A1* | 5/2002 | Hart et al. | 455/12.1 |
| 2002/0065089 A1* | 5/2002 | Soliman | 455/502 |
| 2002/0089946 A1* | 7/2002 | Hutchings | 370/324 |
| 2002/0147032 A1* | 10/2002 | Yoon et al. | 455/562 |
| 2002/0190897 A1* | 12/2002 | Yamaashi et al. | 342/357.01 |
| 2003/0045303 A1* | 3/2003 | Oda et al. | 455/456 |
| 2003/0050008 A1* | 3/2003 | Patterson et al. | 455/12.1 |
| 2003/0054759 A1* | 3/2003 | Da et al. | 455/7 |
| 2003/0054760 A1* | 3/2003 | Karabinis | 455/12.1 |
| 2003/0125046 A1* | 7/2003 | Riley et al. | 455/456 |
| 2004/0077311 A1* | 4/2004 | Riley | 455/12.1 |
| 2004/0092270 A1* | 5/2004 | Banno | 455/456.1 |
| 2004/0145241 A1* | 7/2004 | Arakawa et al. | 307/10.3 |
| 2004/0147221 A1* | 7/2004 | Sheynblat et al. | 455/12.1 |
| 2004/0148083 A1* | 7/2004 | Arakawa et al. | 701/50 |
| 2004/0198386 A1* | 10/2004 | Dupray | 455/456.1 |
| 2004/0198394 A1 | 10/2004 | Syrjarinne et al. | |
| 2004/0253985 A1* | 12/2004 | Cooper et al. | 455/562.1 |
| 2005/0070223 A1* | 3/2005 | Camp et al. | 455/13.2 |
| 2005/0239479 A1* | 10/2005 | Bednasz | 455/456.1 |
| 2006/0029031 A1* | 2/2006 | Koorapaty | 370/350 |
| 2006/0050660 A1* | 3/2006 | Wells | 370/316 |
| 2006/0270408 A1* | 11/2006 | Kobayashi et al. | 455/440 |
| 2007/0077885 A1* | 4/2007 | Schreiber | 455/39 |
| 2007/0165677 A1* | 7/2007 | Monnerat et al. | 370/509 |
| 2007/0184778 A1* | 8/2007 | Mechaley, Jr. | 455/12.1 |
| 2007/0230391 A1* | 10/2007 | Harpak et al. | 370/316 |
| 2007/0252761 A1* | 11/2007 | Koorapaty et al. | 342/464 |
| 2007/0279281 A1* | 12/2007 | Oda et al. | 342/357.06 |
| 2008/0025249 A1 | 1/2008 | Kuppuswamy et al. | |
| 2008/0043663 A1 | 2/2008 | Youssefzadeh et al. | |
| 2008/0089269 A1* | 4/2008 | Tsutsui | 370/316 |
| 2008/0129586 A1* | 6/2008 | Martin | 342/357.03 |
| 2008/0198790 A1* | 8/2008 | Harpak et al. | 370/316 |
| 2008/0232297 A1* | 9/2008 | Mizugaki et al. | 370/316 |
| 2009/0161599 A1* | 6/2009 | Haartsen et al. | 370/326 |
| 2009/0323565 A1* | 12/2009 | Funakubo et al. | 370/280 |
| 2010/0085909 A1 | 4/2010 | Agarwal | |
| 2010/0087141 A1 | 4/2010 | Agarwal | |
| 2011/0116441 A1* | 5/2011 | Wyler | 370/316 |

OTHER PUBLICATIONS

Notice of Allowance for U.S. Appl. No. 12/574,061, mailed on May 14, 2012, 10 pages.

Non-Final Office Action for U.S. Appl. No. 12/574,068, mailed on Dec. 5, 2012, 32 pages.

Final Office Action for U.S. Appl. No. 12/574,068, mailed on Jun. 12, 2013, 30 pages.

Notice of Allowance for U.S. Appl. No. 12/574,068, mailed on Oct. 4, 2013, 16 pages.

* cited by examiner

TERMINAL MEASUREMENT BASED SYNCHRONIZATION FOR MESH SATELLITE COMMUNICATIONS

CROSS-REFERENCES

This application claims priority from U.S. Provisional Patent Application No. 61/103,165, filed Oct. 6, 2008, entitled "SYNCHRONIZATION FOR MESH SATELLITE COMMUNICATIONS", which is hereby incorporated by reference, as if set forth in full in this document, for all purposes.

This application is related to the following commonly assigned patent applications: U.S. patent application Ser. No. 12/574,061, filed concurrently herewith, entitled "EPHEMERIS-BASED SYNCHRONIZATION FOR MESH SATELLITE COMMUNICATIONS"; and U.S. patent application Ser. No. 12/574,068, filed concurrently herewith, entitled "TERMINAL SELF-SYNCHRONIZATION FOR MESH SATELLITE COMMUNICATIONS", which are hereby incorporated by reference, as if set forth in full in this document, for all purposes.

BACKGROUND

The present invention relates to synchronization for communications in general and, in particular, to synchronization for mesh satellite communication networks.

In satellite communications, the distance between a satellite and ground terminal (e.g., a gateway or user terminal) may vary over time. Because of this variance, synchronization between a gateway and ground terminal may occur on an ongoing basis. In some implementations, a gateway may serve as the master, and the user terminals may use communications received from the gateway for synchronization. For example, each user terminal may receive one or more signals from a gateway and, based on a reception time from the gateway to the user terminal or other received information, identify start points for the transmission of frames to, or reception of frames from, the gateway.

In mesh satellite communications, user terminals may communicate with each other via "1-hop" (e.g., directly through the satellite, instead of satellite-gateway-satellite). However, with such mesh communications, there are certain instances when gateway-based synchronization schemes are inadequate. Traditional gateway-based synchronization may not be sufficient to set up timing for user terminal to user terminal mesh communication, as such schemes may not provide adequate timing information for the relevant link between each user terminal and the satellite (e.g., instead timing the gateway to user terminal links). It may, therefore, be desirable to identify novel synchronization techniques to address these timing issues in mesh communications systems wherein timing control is to some extent gateway-based.

SUMMARY

Novel synchronization techniques for mesh satellite communications are described. Systems, devices, and methods are described to implement such synchronization techniques in a range of embodiments. In some embodiments, the arrival time of the gateway signal (or other control signal) may be used to set a start of receive frame time for a terminal. A received control signal from the gateway may then be used to set a start of transmit frame time for the terminal. The distance between the satellite and the gateway may change. To address this issue, in one set of embodiments, ephemeris data is used to modify the start of transmit frame or start of receive frame settings for the terminal or gateway to achieve synchronization for mesh communications. In another set of embodiments, the issue is addressed by using various collections of terminal measurements to modify the start of transmit frame and start of receive frame settings for the terminal or gateway to achieve synchronization for satellite mesh communications. In still another set of embodiments, a burst from a terminal is used to set a start of receive frame at a terminal for mesh communications. This burst may be a broadcast burst by a master terminal or self-sync burst.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 21A-22B are timing diagrams illustrating the use of terminal to terminal timing data to set start of receive frame timing for mesh satellite communications according to various embodiments of the invention.

FIG. 22 is a block diagram illustrating components of one or more devices using terminal to terminal timing data for mesh synchronization in a satellite communications system according to various embodiments of the invention.

DETAILED DESCRIPTION OF THE INVENTION

Novel synchronization techniques for mesh satellite communications are described. In some embodiments, the arrival time of the gateway signal (or other control signal) may be used to set a start of receive frame time for a terminal. A received control signal from the gateway may then be used to set a start of transmit frame time for the terminal. The distance between the satellite and the gateway may change. To address this issue, ephemeris data may be used to modify start of transmit frame and start of receive frame settings for the terminal or gateway to achieve synchronization for mesh communications. In another set of embodiments, various collections of terminal measurements may be used to modify such start of transmit frame and start of receive frame settings. In still other embodiments, a transmission from a terminal is used to set start of receive frame timing at a terminal for mesh communications. This transmission may be a self-sync burst or a broadcast burst from a master terminal.

The following description provides examples only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

Figure 1:
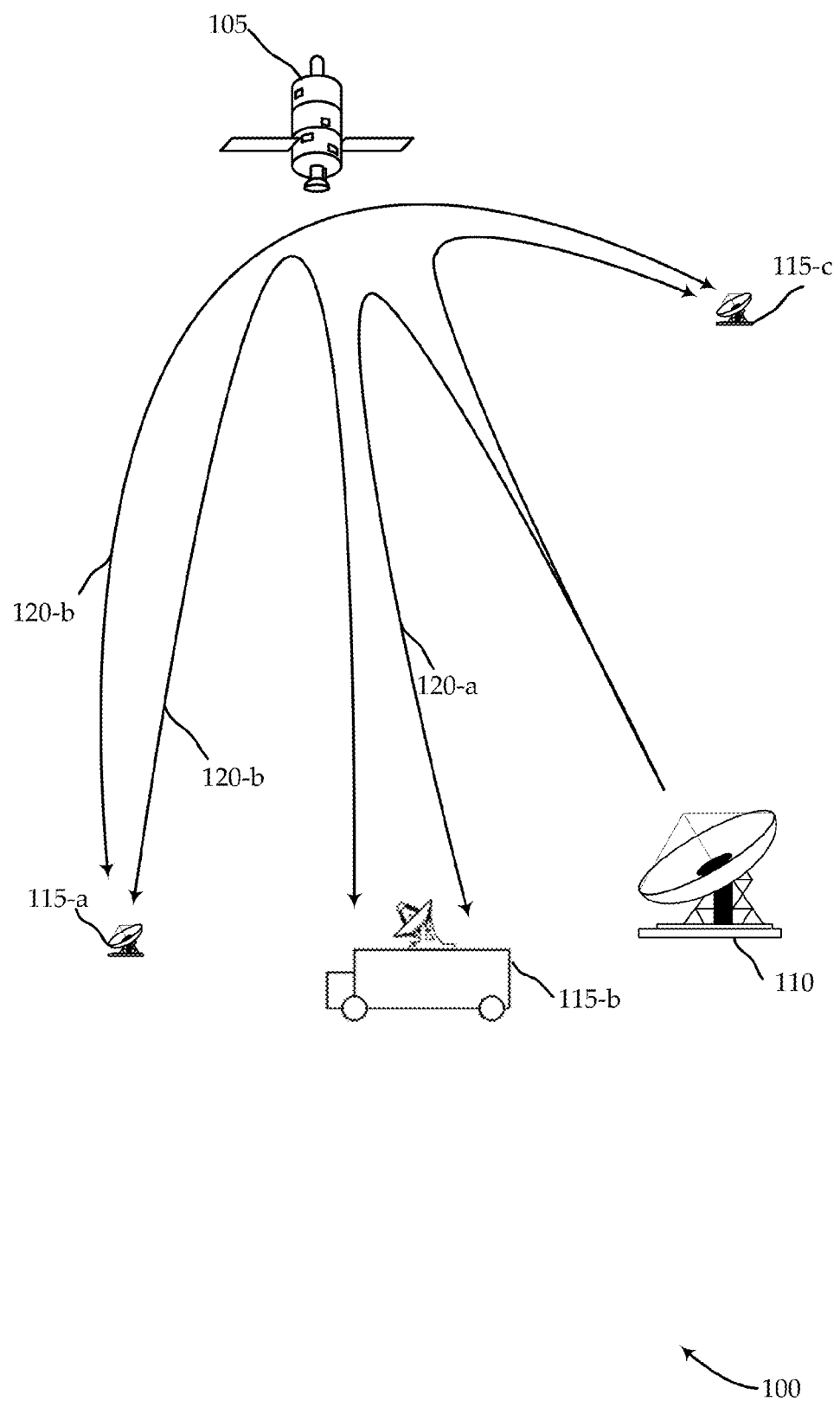
FIG. 1 is a block diagram of a satellite communications system configured according to various embodiments of the invention.

Systems, methods, devices, and software are described for synchronization in mesh satellite communications systems where gateway-based timing is used. For example, in Digital Video Broadcasting-Return Channel via Satellite (DVB-RCS) systems, timing for the return link is based on gateway to terminal timing, and modifications may therefore be needed for certain mesh communications. Referring to FIG. 1, a block diagram is shown illustrating a satellite communications system 100 with various links 120. As shown in the illustrated embodiment, these may be mesh links 120-b. However, there may be star links 120-a as well, and thus in certain embodiments the system 100 is a mesh/star hybrid. The system 100 includes a satellite 105, in communication with a gateway 110 and other user terminals 115 (which may be fixed, communications on the move (COTM), or other mobile or partially mobile terminals).

In some star satellite systems (e.g., DVB-RCS), MF-TDMA bursts from user terminals 115 to a gateway 110 may be set to arrive at specific times on certain frequencies. In order to allocate return link time slots to users, the user terminals 115 transmissions are often synchronized to a master gateway 110, the synchronization based on control signals from the gateway terminal 110. Different user terminals 115 may be located in different geographic locations, and be different distances from satellite 105. Thus, user terminal 115 signals may have to travel for different amounts of time to reach the gateway 110 at the same time. Also, satellite 105 position changes may vary, causing the time delays between a gateway 110 and satellite 105 and between a satellite 105 and user terminals 115 to change. Thus, synchronization updates for user terminals 115 may occur on a regular basis (e.g., every 10 minutes, every hour, every four hours, or adaptively).

DVB-RCS networks specify network timing procedures for a return link, where initial coarse timing established may be established for user terminals 115 based on geo-location of terminals 110, 115 and the satellite 105. Fine timing may based be on closed loop feedback procedure, where a gateway 110 monitors burst arrival times from a user terminal 115, and sends timing corrections back to a user terminal 115. To add mesh, a user terminal 115-*a* could communicate with another user terminal 115-*b* also using return channel format (e.g., the same MF-TDMA channelization and timing as the return link). Thus, in such instances, bursts between user terminals 115 may need to be synchronized to ensure that time slots can be properly allocated and arrive at precise times. The gateway-centric scheme measuring time between a gateway 110 and user terminal 115 of a DVB-RCS network, standing alone, may not be capable of such synchronization without additional information.

For purposes of the following discussion, the terms "transmitter" and "receiver" may be used, but it is worth noting the above links 120 may be bi-directional, so a given terminal 110, 115 may be both a transmitter and receiver simultaneously. For purposes of implementing certain embodiments of the invention, terminals 110, 115 include "sync modules," which may be integrated processing units allowing a terminal 110, 115 to set or modify sync time for the timing of start of transmit frames or start of receive frames at a user terminal 115 or gateway 110. For purposes of the following discussion, start of receive frame may, but need not, be referred to as "SORF", and start of transmit frame may, but need not, be referred to as "SOTF".

Figure 2:
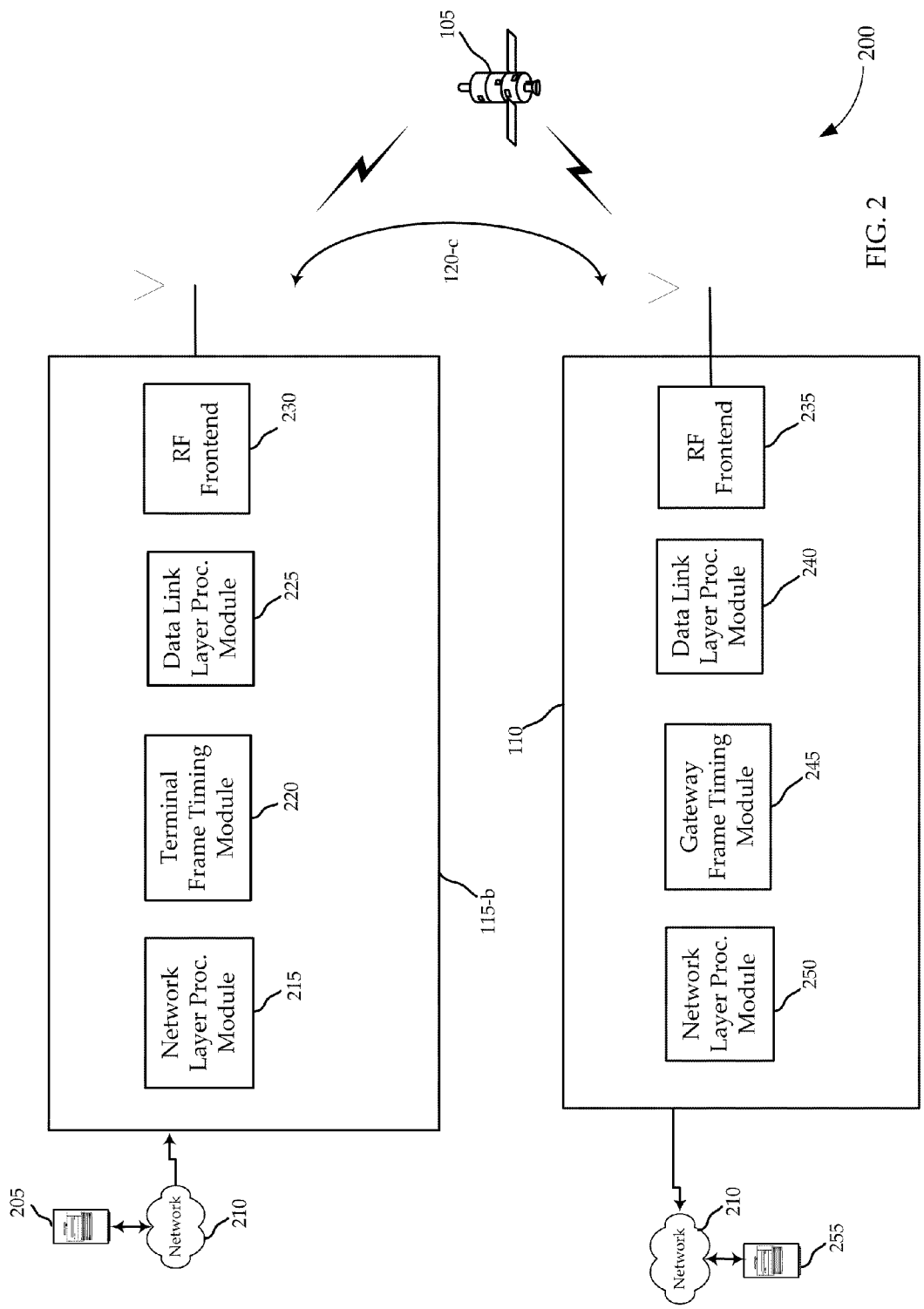
FIG. 2 is a block diagram of a terminal and a gateway in a satellite communications system according to various embodiments of the invention.

Referring next to FIG. 2, a block diagram is shown illustrating an example configuration 200 for certain devices of the satellite communications system 100 of FIG. 1. While the example configuration illustrates communication between a COTM terminal 115 and gateway 110, those skilled in the art will recognize that similar components may be used between other links for the same or other types of terminals, or between a satellite and a terminal. For example, the sync modules 220, 245 may be used for a range of synchronization alternatives described below. This configuration may be used throughout this description to illustrate the different synchronization options.

In one embodiment, an initiating terminal 205 (e.g., a user device or terminal, or a server) transmits data via a network 210 (e.g., the Internet or a wireless local area network (LAN)) to the COTM terminal 115-*b*. The data is received by the COTM terminal 115-*b*. The COTM terminal 115-*b* is made up of a network layer processing module 215, a terminal frame timing module 220, a data link layer processing module 225, an RF frontend 230, and other components known in the art. The received data may, for example, be a data packet carried by a wireless signal.

After some intermediate processing by other components (not shown) of the COTM terminal 115-*b*, the data may be processed by a network layer processing module 215, and then forwarded to the data link layer processing module 225, where a data link protocol (e.g., HDLC) is applied. The terminal frame timing module 220 may then set the timing for the transmission, perhaps based on synchronization messages (or other control signals) received from the gateway 110 and on a time slot allocation from the gateway 110. Note that the terminal frame timing module 220 may set the timing for receiving frames, based on different synchronization messages (or other control signals) received from the gateway 110. The terminal frame timing module 220 may locally adjust expected receive or transmit times based on synchronization messages (or other control signals) received from the gateway 110. These synchronization messages may be generally referred to herein as control signals, and may include both synchronization specific control signals, and any other gateway transmission signals which are used to set or adjust timing. The link layer packet is then processed by RF frontend 230, and transmitted via a wireless signal through the satellite 105 to the gateway 110 at the time specified by the terminal frame timing module 220.

The gateway 110 receives the signal. The gateway 110 in this embodiment is made up of an RF frontend 235, data link layer processing module 240, gateway frame timing module 245, and network layer processing module 250. Its RF frontend 235 may downconvert, amplify, and demodulate the signal, thereby reproducing the link layer packet from the COTM terminal 115-*b*. The gateway frame timing module 245 may serve as the master for synchronization purposes, sending synchronization messages to the COTM terminal 115-*b* to control, receive, and transmit timing to and from the gateway. For example, and as noted above, the gateway frame timing module 245 may monitor arrival times of packets from the COTM terminal 115-*b*, and send control signals to correct the start of transmit time for the COTM terminal 115-*b*. The gateway frame timing module 245 may also allocate time slots on the return link. The gateway frame timing module 245 may set timing and send signals that may be used by the COTM terminal 115-*b* to adjust their receive times.

The data link layer processing module 240 of the gateway 110 may process the received packet, as known in the art, to produce the IP packet for the network layer processing module 250. The data which originated at initiating terminal 205, and was routed through the COTM terminal 115-*b*, satellite 105, and fixed terminal 110, may then be passed through a network 210 to an end terminal 255. A similar process may occur for communications in the gateway to user terminal direction.

This set-up may synchronize properly when all communication between terminals 115 flows through the gateway 110. However, without certain additional information, the timing between user terminals 115 through the satellite 105 may not be known. In some embodiments, techniques are described for gateway and terminal frame timing modules to sync up so as to provide timing information for mesh communication.

Figure 3:
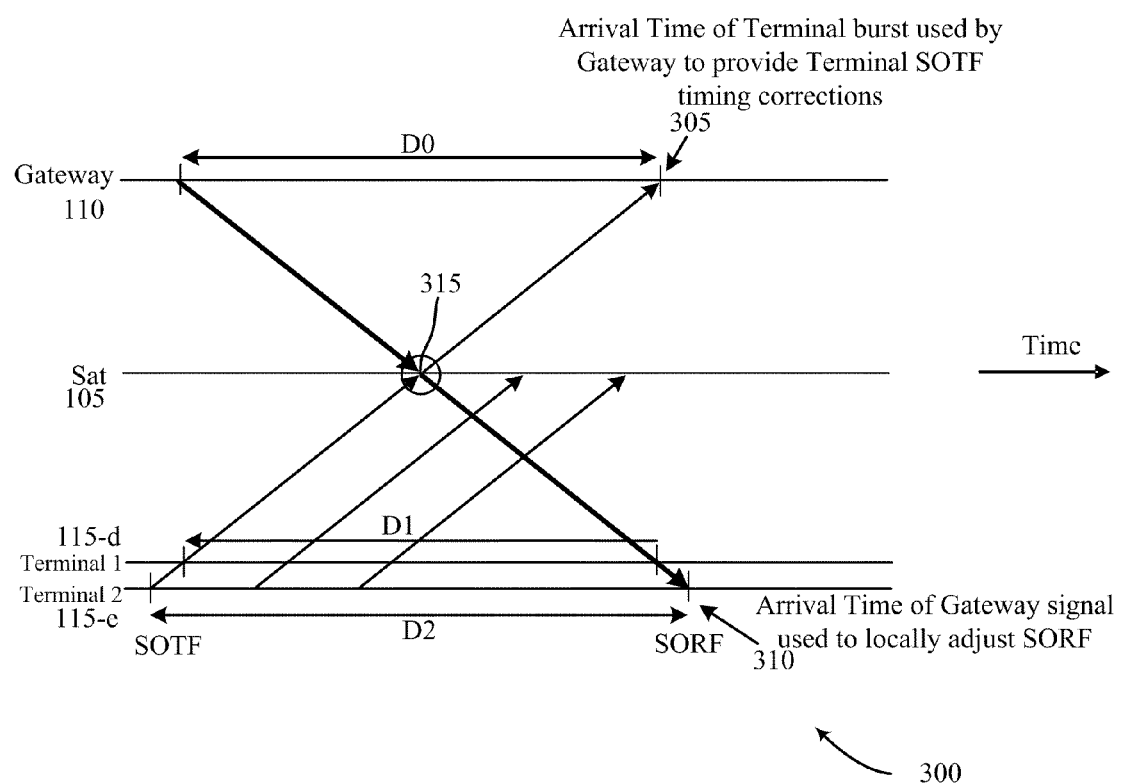
FIG. 3 is a timing diagram illustrating synchronization methods used according to various embodiments of the invention.

Turning to FIG. 3, a timing diagram 300 may be used to illustrate certain issues. For purposes of brevity herein, a user terminal 115 may be addressed as a "terminal" or "terminal 115," a gateway 110 may be referred to as "gateway" or "gateway 110," and the satellite 105 may be referred to as "sat", "sat 105", or "satellite 105". The timing diagram 300 illustrates how the arrival time 305 at the gateway 110 of a terminal burst may be used by the gateway 110 to create a control message to be later sent to a terminal 115 to correct the start of transmit frame at the terminal 115. Also, the arrival time 310 at the terminal 115 of a gateway transmission (or other control signal) may be used to locally adjust the start of receive frame time. Terminal 115 start of receive frame and start of transmit frame may be established based on NCR value received from gateway 110. However, timing for mesh transmissions between terminals 115 through a satellite 105 may not be able to be determined based solely on the above measurements. The gateway 110 to terminal 115 times, standing alone, may not provide sufficient information to synchronize timing at the satellite 105 to provide for mesh communications.

One way to synchronize a terminal 115 for mesh transmissions is to coordinate the arrival of a mesh transmission at a satellite 105 with the arrival of a downstream transmission from the gateway 110 at the satellite 105. If points (for example, start of frame points) may be coordinated at the satellite 315, the mesh communications timing problems may be addressed. However, there are a number challenges which may make this difficult or complex.

Figure 4A:
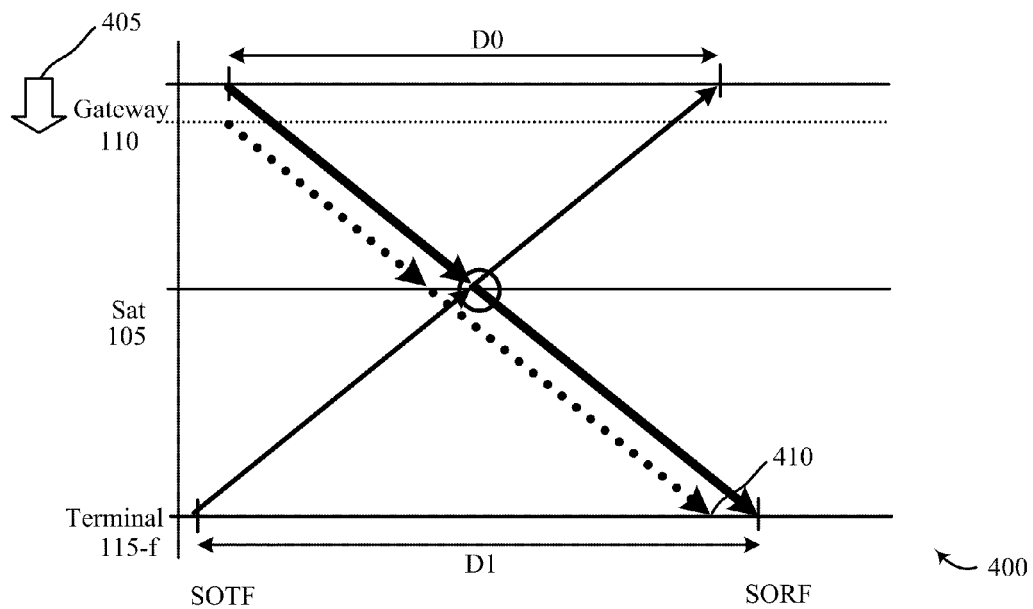
FIGS. 4A, 4B, and 4C are timing diagrams illustrating synchronization issues addressed according to various embodiments of the invention.

Referring next to FIG. 4A, a timing diagram 400 illustrates how certain issues may arise for mesh communications. Assume that the gateway 110 and satellite 105 move 405 closer together by d µs, while the distance between the satellite 105 and the terminal 115-f do not change. In this instance, the gateway 110 signal arrives 410 at terminal 115-f d µs earlier. The travel time for a terminal 115-f signal sent to itself via a mesh link would not change.

Figure 4B:
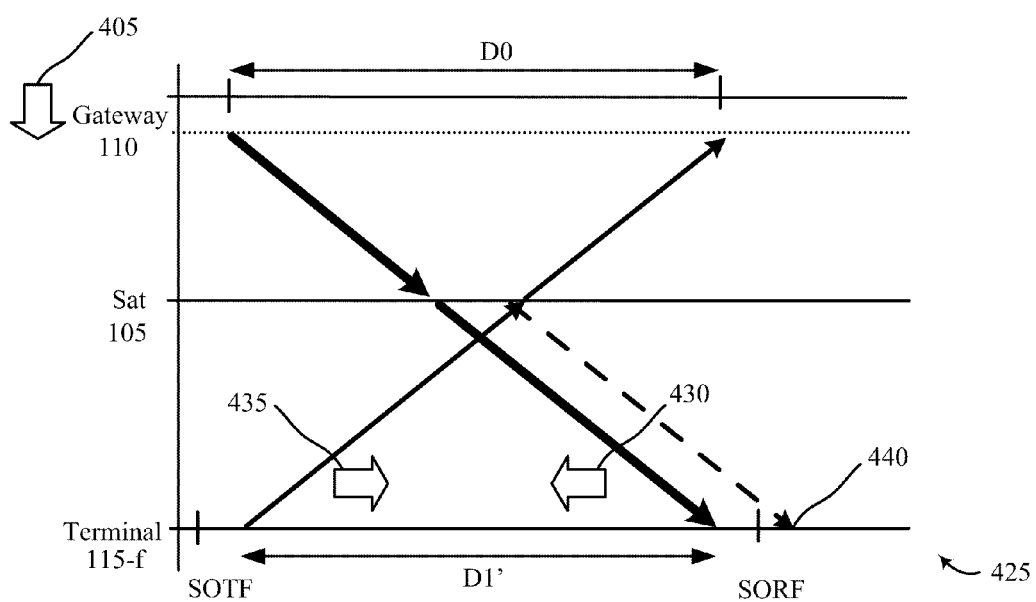

Continuing the discussion from FIG. 4A, while turning to FIG. 4B, a timing diagram 425 illustrates how synchronization operations could lead to timing errors in such situations. According to certain implementations, a terminal 115-f may locally move 405 SORF left 430 by d µs because of the earlier arrival time of the gateway 110 transmission. Gateway 110 may measure the offset of a terminal signal arrival and may send a correction to terminal 115-f, causing the terminal 115-f to move SOTF right 435 by d µs. Traditionally, in non-mesh systems distance changes between satellite 105 and terminals 115 might be handled this way, and this is a standard DVB-RCS procedure. Note, however, that a terminal to terminal mesh signal arrives at the terminal 2d µs late 440, as the terminal-to-terminal burst timing is off. If a gateway 110 receives its own signal from a satellite 105, these problems could be addressed to some extent using this information. It may be assumed that gateway 110, therefore, cannot receive its own signal or does not solve the problem with this information.

Figure 4C:
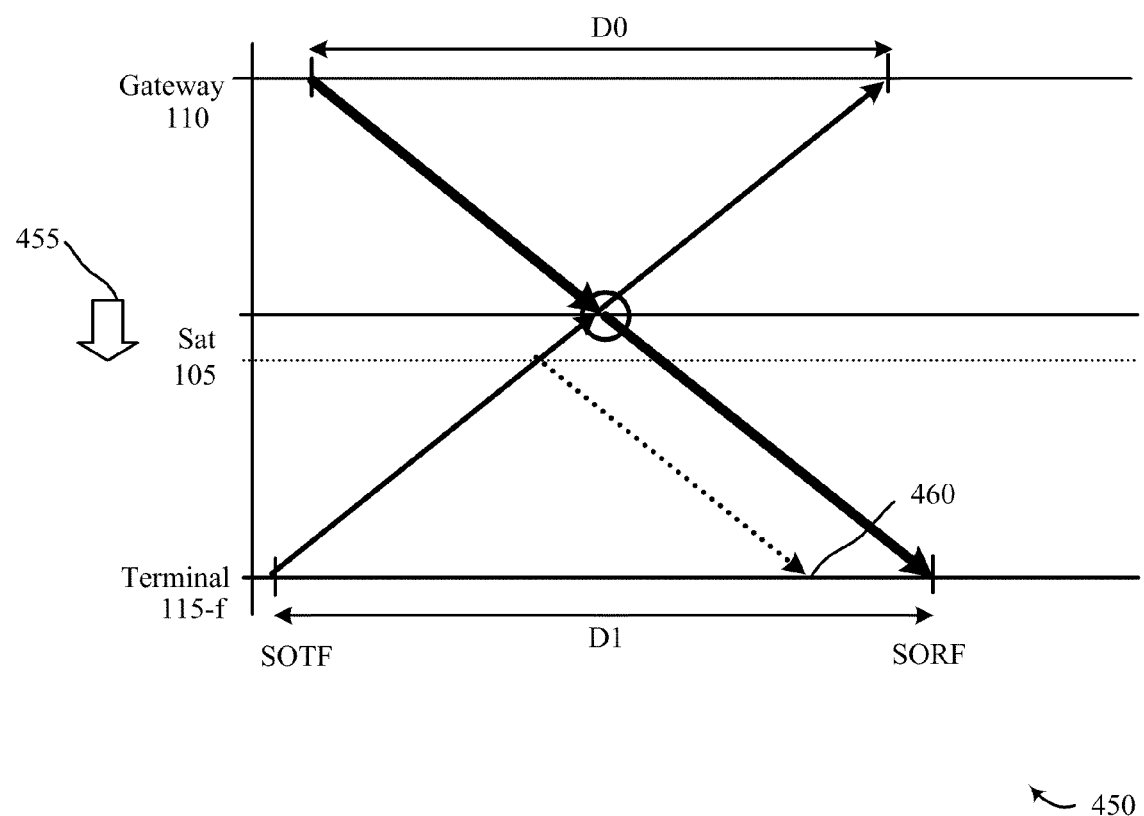

Referring next to FIG. 4C, a timing diagram 450 illustrates how synchronization operations could lead to error in other situations. Satellite 105 moves 455 toward terminal 115-f by d µs, while the distance between gateway 110 and terminal 115-f remains unchanged. Gateway 110 signal arrival time at the terminal 115-f does not change, and terminal 115-f signal arrival time at gateway 110 does not change. So, according to certain traditional implementations, terminal 115-f SORF and SOTF would not change. However, terminal 115-f signal arrives at terminal 115-f early 460 by 2d µs. The gateway 110 may not be able to detect this condition by gateway 110 to terminal 115-f timing alone, and thus a design that uses gateway-terminal timing measurements only may not work. Even if a gateway 110 receives its own signal from a satellite 105, these problems may not be able to be addressed using that information alone.

I. Ephemeris Data Based Synchronization

Novel synchronization techniques for mesh satellite communications using ephemeris data are described. In some embodiments, gateway signals may be used to set start of receive frame timing and start of transmit frame timing for the terminal. The distance between the satellite and the gateway may change. To address the issues that may arise, in one set of embodiments, ephemeris data is used to modify start of receive frame timing and start of transmit frame timing settings for the terminal or gateway to achieve synchronization for mesh communications.

Figure 5A:
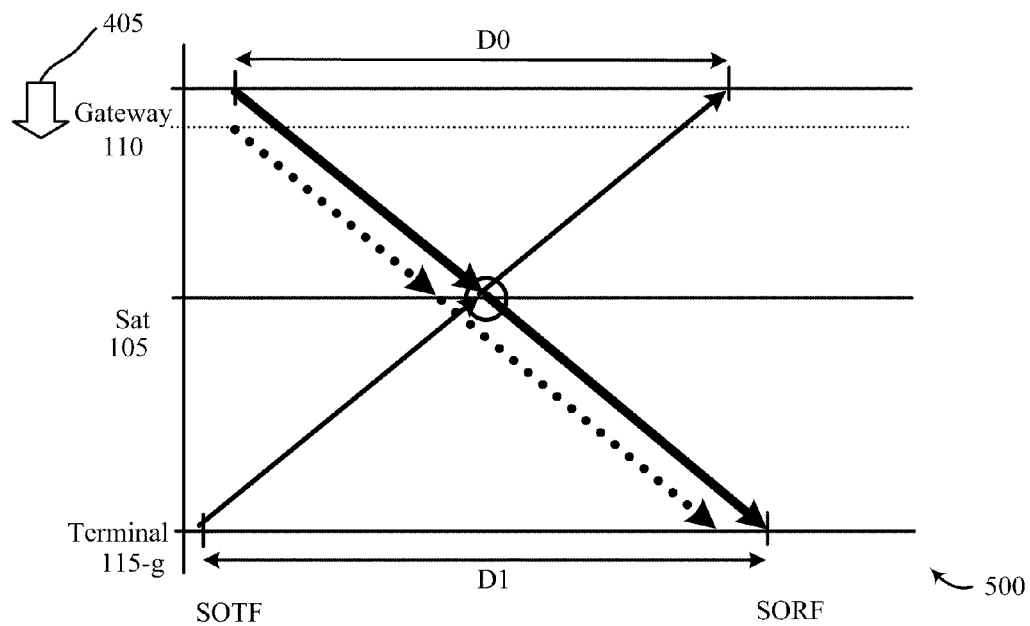
FIGS. 5A and 5B are timing diagrams illustrating the use of ephemeris data to address synchronization issues according to various embodiments of the invention.

Referring first to FIG. 5A, a timing diagram 500 illustrates certain issues that may arise for mesh communications. Assume that the gateway 110 and satellite 105 move 405 closer together by d µs, while the distance between the satellite 105 and the terminal 115-g do not change (as illustrated in FIG. 4A). In this instance, the gateway 110 signal arrives at terminal 115-g d µs earlier. The travel time for a terminal 115-g signal sent to itself via a mesh link would not change.

Figure 5B:
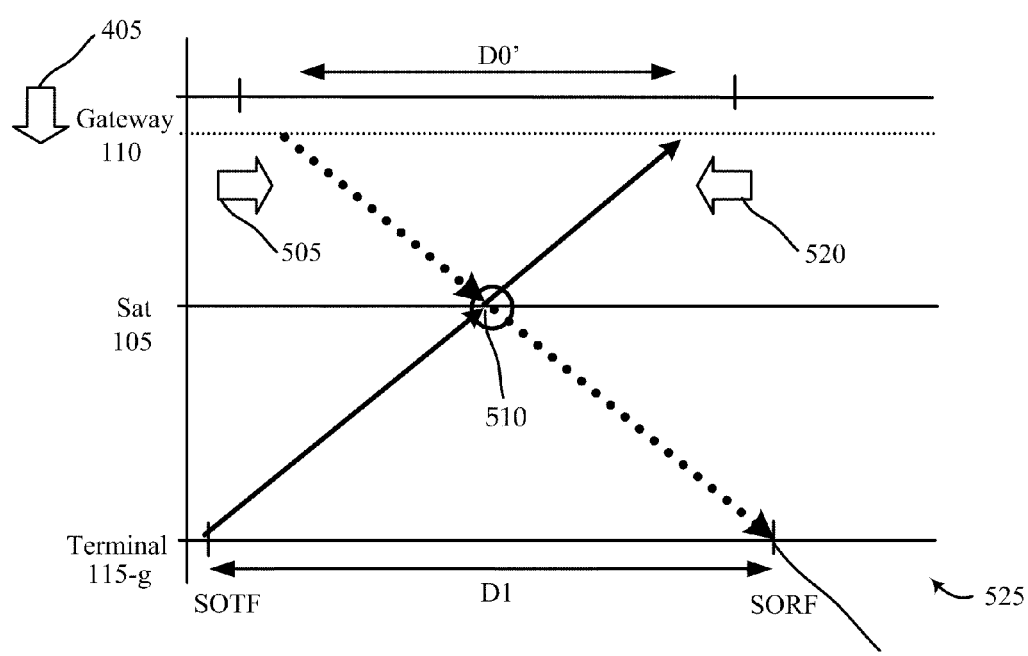

Continuing the discussion from FIG. 5A, and turning to FIG. 5B, a timing diagram 525 illustrates how certain synchronization techniques may avoid timing errors in some embodiments. In one embodiment, a satellite 105 or other source may transmit ephemeris data to the gateway 110. This data may include latitude, longitude, height above the earth, or other information indicating the spatial position of the satellite 105 (perhaps relative to a gateway 110 or terminal 115). A gateway 110 may use this ephemeris data to move its SOTF (the SOTF for the gateway) right 505 by d µs. It may use the ephemeris data to determine when the signal from terminal 115-g arrives at the satellite 510, and move 505 its SOTF accordingly (so there is a common reference point 510 at the satellite). The gateway 110 may use the ephemeris data to move its SORF left 520 by d µs. By doing so, the gateway 110 will not need to send correction directions to terminal 115-g, and instead will deem the arrival time of the terminal 115-g signal to be correct. According to one embodiment, therefore, the terminal 115-g timing does not change.

Figure 6A:
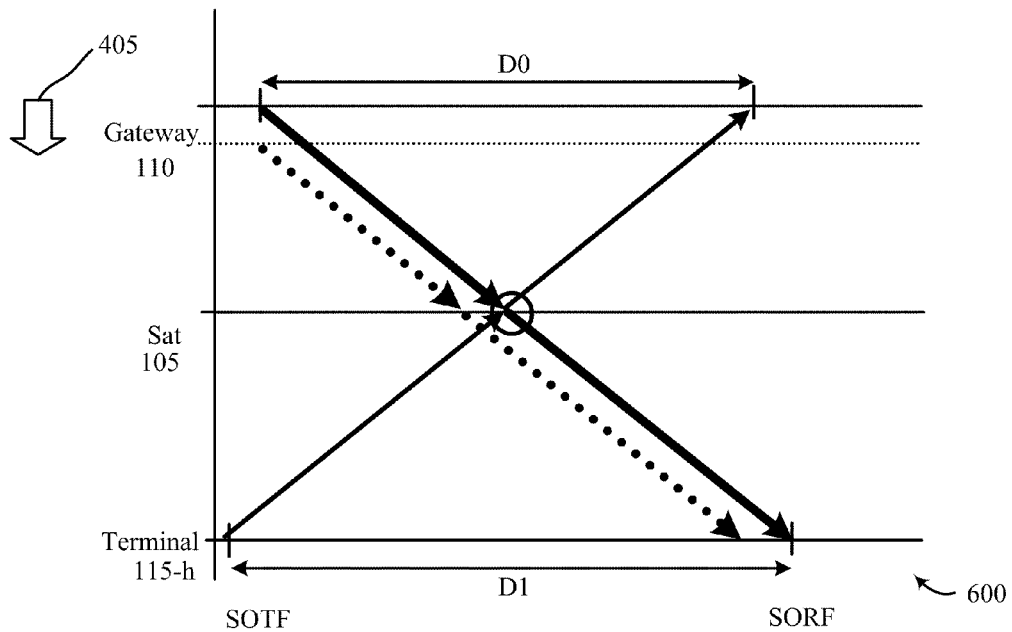
FIGS. 6A and 6B are timing diagrams illustrating an alternative use of ephemeris data to address synchronization issues according to various embodiments of the invention.

Referring next to FIG. 6A, a timing diagram 600 again illustrates certain issues that may arise for synchronization with mesh communications. Assume that the gateway 110 and satellite 105 move 405 closer together by d µs, while the distance between the satellite 105 and the terminal 115-h does not change (as illustrated in FIG. 4A). In this instance, the gateway 110 signal arrives at terminal 115-h d µs earlier. The travel time for n terminal 115-h signal sent to itself via a mesh link would not change.

Figure 6B:
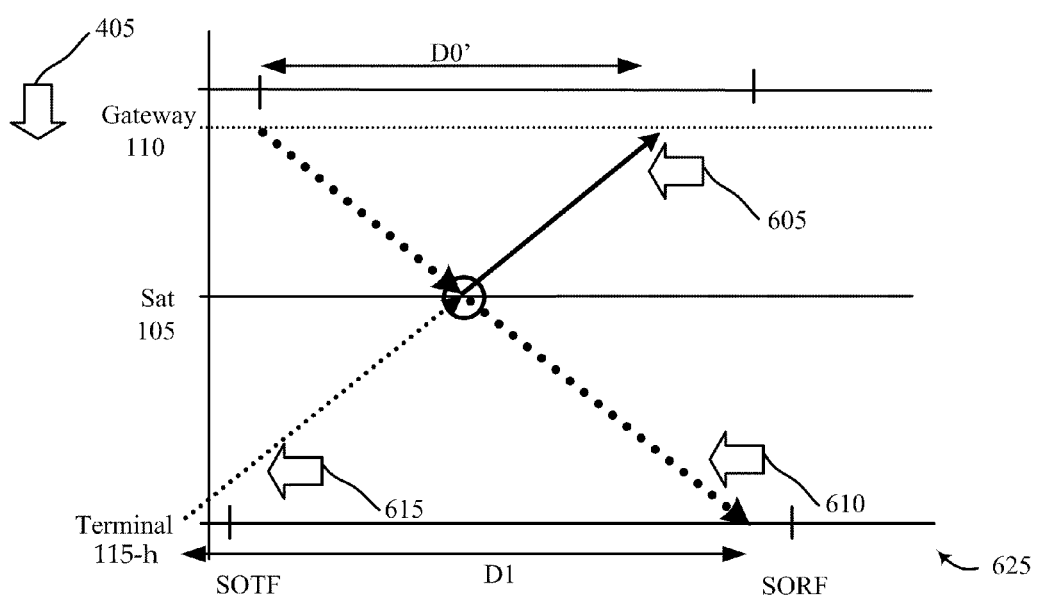

Continuing the discussion from FIG. 6A, while turning to FIG. 6B, a timing diagram 625 illustrates how modified synchronization operations may avoid timing errors in some embodiments. In one embodiment, a satellite 105 or other source may transmit ephemeris data to the gateway 110, as described above. A gateway 110 may use this ephemeris data, but in one embodiment does not move its SOTF (the SOTF for the gateway 110) right by d µs. Instead, the gateway 110 uses the ephemeris data to move its expected SORF left 605 by 2d µs. Terminal 115-h may locally determine to move terminal SORF left 610 by d µs (e.g., because its local timing indicates that the signal from the gateway 110 is arriving d µs early). The gateway 110 may measure and send a correction to terminal 115-h, for a terminal SOTF left move 615 by d µs (e.g., because after the gateway 110 SORF is moved left 605 by 2d µs, the gateway 110 thinks the signal received from the terminal 115-h is d us late, and will send a correction signal accordingly).

As noted, the ephemeris data for the synchronization described with reference to FIGS. 5B and 6B may be generated and processed by the gateway 110, terminal 115, or other device or set of devices. A variety of other schemes may be used with the retrieved ephemeris data to adjust the timing for mesh communications. It is also worth noting the processing related to the ephemeris data may be performed by the gateway frame timing module 245 or terminal frame timing module 220 of FIG. 2, and may be used in the system 100 of FIG. 1 to achieve the synchronization of burst mesh communications with the downstream signal of the gateway 110. Also, in lieu of or in addition to the ephemeris data, the gateway 110 or terminal 115 may perform timing operations (e.g., various ping operations) on transmissions to the satellite, and the principles discussed with reference to FIGS. 5B and 6B may be applied thereto.

Figure 7:
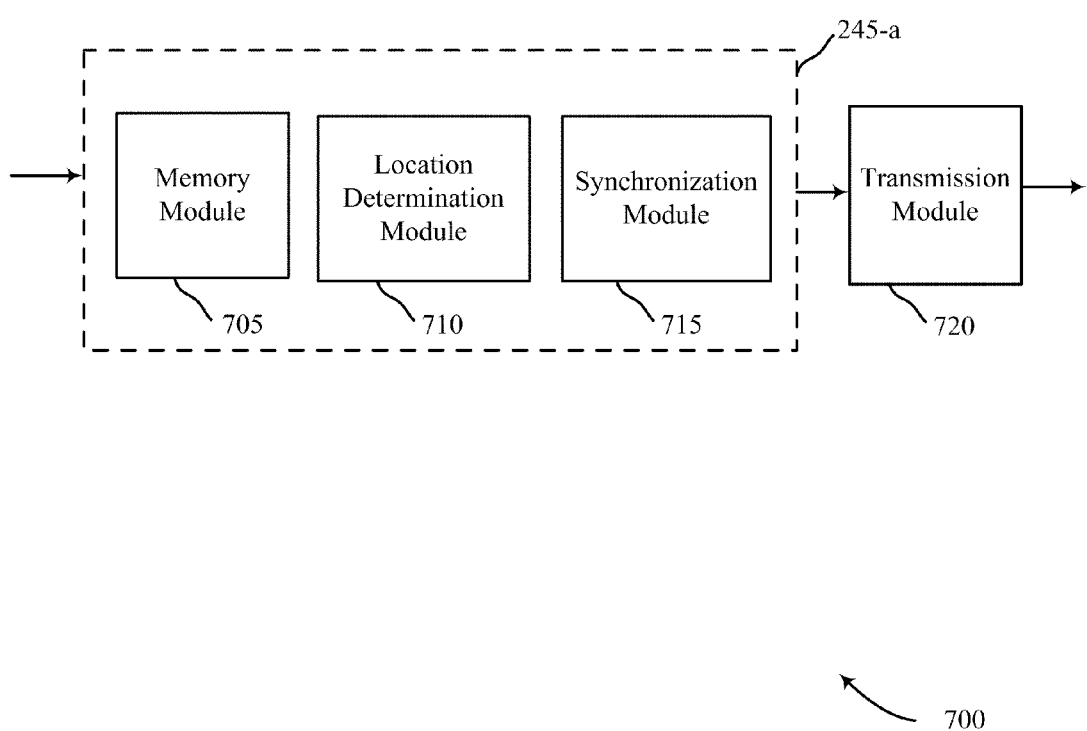
FIG. 7 is a block diagram illustrating components of one or more devices using ephemeris data for mesh synchronization in a satellite communications system according to various embodiments of the invention.

Turning to FIG. 7, a block diagram is shown illustrating an example configuration 700 of a gateway timing module 245-a and a transmission module 720 that may provide synchronization for mesh satellite communications according to various embodiments of the invention. This configuration 700 may be implemented in the gateway 110 of FIG. 1 or 2. These modules 245-a and 720 may, therefore, be the gateway frame timing module 245, data link layer processing module 240, and RF frontend 235 in the gateway 110 of FIG. 2. However, some or all of the functionality of these modules may be implemented in other devices or sets of devices.

The illustrated embodiment includes a memory module 705, a location determination module 710, a synchronization module 715, and a transmission module 720. The memory module 705, location determination module 710, and synchronization module 715 may together make up the gateway timing module 245-a. The modules illustrated in FIG. 7 may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The memory module 705 may be configured to store ephemeris data identifying the location of the satellite. This ephemeris data may include coarse orbital parameters for a satellite (e.g. satellite 105 of FIG. 1). In different embodiments, the ephemeris data may include very precise orbital and clock information for the satellite as necessary for precise positioning. In some embodiments, the memory module may receive ephemeris data in substantially real-time from the satellite. In other embodiments, the ephemeris data indicating a location of the satellite may be received for a future period of time (e.g., an upcoming week, or month). The memory module 705 may also be configured to store location data for a user terminal or gateway, reflecting real-time or forward-looking location data. This location data may include latitude, longitude, altitude, and any other information indicating the spatial position.

The location determination module 710 may use the stored ephemeris data and the stored location data for a gateway and user terminal to determine respective positions for the user terminal, gateway, and satellite. These may be the user terminal 115, gateway 110, and satellite 105 of FIG. 1 or 2.

During a first phase, the synchronization module 715 may use the ephemeris data and location data for a gateway and user terminal to set coarse start of transmit frame timing and start of receive frame timing at the gateway and the user terminal. The timing may be set to establish a common point of reference at the satellite for frames transmitted by the gateway and the user terminal.

Assume that coarse start of transmit frame timing and start of receive frame timing has been set at the gateway and the user terminal. A set of control signals including timing information generated by the synchronization module 715 may be transmitted by transmission module 720 to a user terminal to refine the start of receive frame timing at the user terminal. This set of control signals may be sent to all, or a subset, of the downstream terminals to set each terminal's start of receive frame timing. A user terminal may use the receive time of the transmitted signals to set start of receive frame timing at the user terminal. The set of control signals may simply be a standard downstream transmission, or may be formatted with the specific purpose of setting or adjusting receive frame timing at a receiving user terminal. In other embodiments, other forms of control signals may be used.

Also, after the coarse start of transmit frame timing is set at the gateway and user terminal, a set of signals may be transmitted (e.g., according to the coarse settings) from the user terminal via the satellite and received, for example, at the gateway. The configuration 700 or, more specifically, the synchronization module 715, may use the receive time of the signals to determine refinements to the start of transmit frame timing at the user terminal. The synchronization module 715 may generate a second set of control signals with information to refine the start of the transmit frame timing at the user terminal. This second set may be distributed to the user terminal by transmission module 720. The coarse settings and refinements may be set to establish a common point of reference at the satellite for frames transmitted by the gateway and the user terminal, to allow for mesh satellite communications.

The ephemeris data may then be used by the location determination module 710 to identify an increase or a decrease in distance between the gateway and the satellite. The location determination module 710 may also identify an increase or decrease in distance between the satellite and the user terminal. As noted above, there may be issues when the changes in distance differ. Thus, in one set of embodiments, the synchronization module 715 is configured to signal a change to the start of transmit frame timing and/or the start of receive frame timing at the user terminal or gateway when there is a differential in the changes in distances. In other embodiments, the synchronization module 715 is configured to signal a change to the start of transmit frame timing and/or the start of receive frame timing at the user terminal or gateway when there is simply a change in distance between the gateway and the satellite. The synchronization module 715 may coordinate the changes to create a common point of reference and thereby maintain or set up a synchronized arrival, at the satellite, of frames or other signals transmitted from the user terminal and the gateway. This coordination may set up synchronization at the satellite for mesh satellite communications.

To account for the change in distance between the gateway and the user terminal, the synchronization module 715 may generate a set of control signals to be transmitted by transmission module 720 to a user terminal to change the start of receive frame timing at the user terminal. The adjustment may be to set earlier start of receive frame timing (e.g., in the event that the gateway to satellite distance decreases), later start of receive frame timing (e.g., in the event that the gateway to satellite distance decreases), or simply maintain current start of receive frame timing. This set of control signals may be sent to all, or a subset, of the downstream terminals. Each user terminal may use the receive time of the transmitted signals to set start of receive frame timing at the user terminal. In such cases, the set of control signals may simply be a standard downstream broadcast transmission. Alternatively, control signals may be formatted with the specific information directing the user terminal in setting or adjusting receive frame timing at the receiving user terminal. In other embodiments, other forms of control signals may be used.

To account for the change in distance between the gateway and the user terminal, the synchronization module 715 may generate an adjusted set of control signals to be transmitted by transmission module 720 to a user terminal to change the start of transmit frame timing at the user terminal. A set of signals may first be transmitted from the user terminal according to a current start of transmit frame setting at the user terminal, and the transmission may be directed to the gateway via the satellite. The configuration 700 or, more specifically, the synchronization module 715 (e.g., integrated into the gateway), may use the receive time of the signals from the user terminal, along with change of distance information from the ephemeris data, to determine an adjustment to the start of transmit frame timing (which may be earlier, later, or same timing) at the user terminal. The synchronization module 715 may generate an adjusted set of control signals with information to change or maintain the start of the transmit frame timing at the user terminal based on the information in the adjusted set of control signals. This adjusted set may be transmitted to the user terminal by transmission module 720. The refinements may be set to establish a common point of reference at the satellite for frames transmitted by the gateway and the user terminal, to allow for mesh satellite communications.

It is again worth noting that the synchronization module 715 may make the changes to the start of transmit frame timing and start of receive frame timing at the user terminal to create a common point of reference and thereby maintain (or set up) a synchronized arrival, at the satellite, of frames or other signals transmitted from the user terminal and the gateway. This may be done to allow for mesh communications to be facilitated within a star communications system.

It is also worth noting that, in certain embodiments, the start of transmit frame timing at the gateway corresponds to the start of receive frame timing at the user terminals. Similarly, the start of transmit frame timing at the user terminals may correspond to the start of receive frame timing at the gateway. Therefore, while much of the discussion above relates to control signals sent by the gateway to change timing at the user terminal, note that there may in these embodiments be corresponding changes to the start of transmit frame and start of receive frame timing at the gateway (e.g., a later start of transmit frame timing at the user terminal may correspond to a later start of receive frame timing at the gateway, or an earlier start of receive frame timing at the user terminal may correspond to a earlier start of transmit frame timing at the gateway). However, in some instances, timing changes may occur at the gateway (either in the start of transmit frame timing or start of receive frame timing, or both) in order to maintain timing at the user terminal (either in the start of transmit frame timing or start of receive frame timing, or both). This may be done to create a common point of reference at the satellite and thereby maintain (or set up) a synchronized arrival, at the satellite, of frames (or other signals) transmitted from the user terminal and the gateway.

Figure 8:
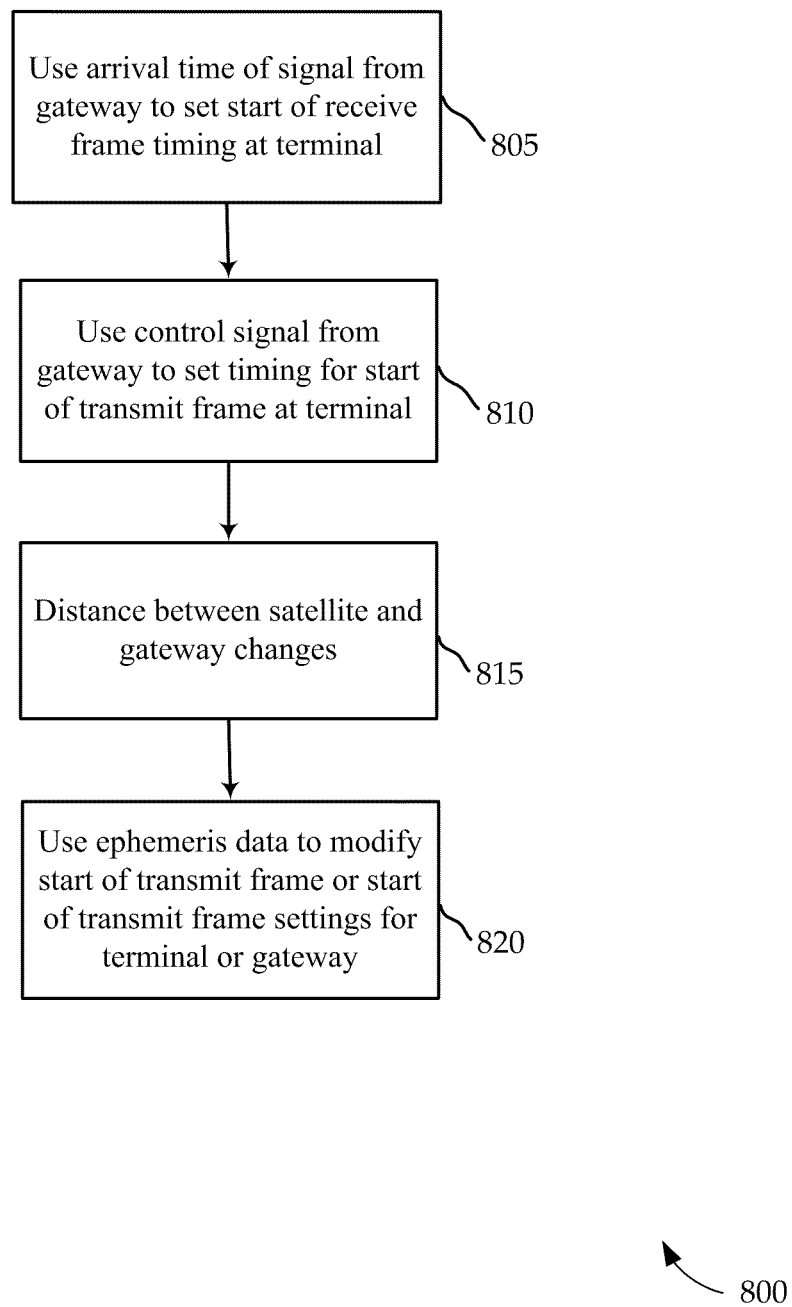
FIG. 8 is a flowchart illustrating a method of using ephemeris data to provide for synchronized mesh satellite communications in a system including a gateway and a terminal communicating via satellite.

FIG. 8 is a flowchart illustrating a method 800 of using ephemeris data to provide for synchronized mesh satellite communications in a system including a gateway and a terminal communicating via satellite, according to various embodiments of the invention. The method 800 may, for example, be performed within the system 100 of FIG. 1 or system 200 of FIG. 2.

At block 805, the arrival time of the signal transmitted from the gateway to the terminal is used to set the start of receive frame timing at the terminal. At block 810, a control signal transmitted from the gateway is used to set the start of transmit frame timing at the terminal. At block 815, the distance between the satellite and the gateway changes. At block 820, ephemeris data is used to modify the start of transmit frame or the start of transmit frame settings for the terminal or gateway.

Figure 9:
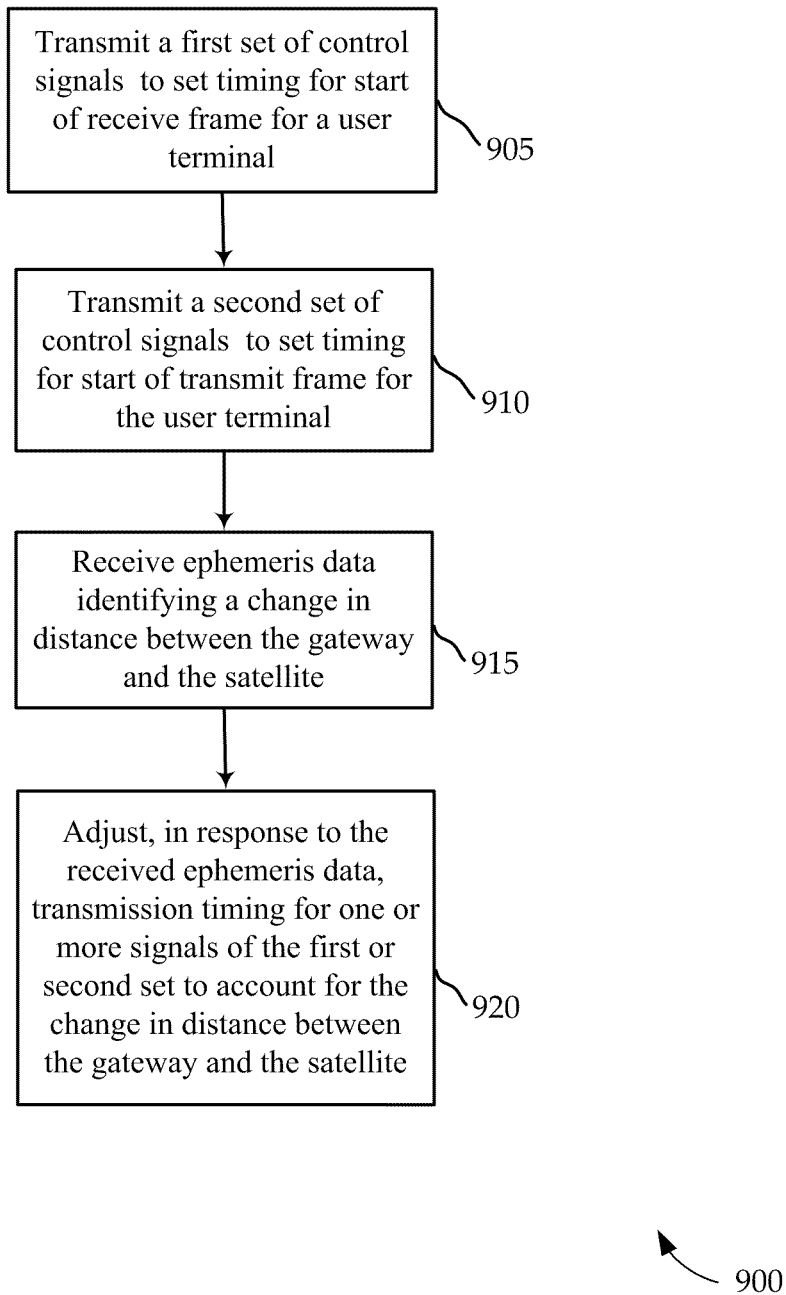
FIG. 9 is a flowchart illustrating a method of synchronizing a satellite communications system for mesh communications using ephemeris data.

FIG. 9 is a flowchart illustrating a method 900 of synchronizing a satellite communications system for mesh communications using ephemeris data according to various embodiments of the invention. The method 900 may, for example, be performed within the system 100 of FIG. 1 or system 200 of FIG. 2. The method 900 may be performed by the gateway 110 of FIG. 1 or 2 or, more specifically, by the configuration 700 illustrated in FIG. 7.

At block 905, a first set of control signals is transmitted to set a start of receive frame for a user terminal. At block 910, a second set of control signals is transmitted to set a start of transmit frame for the user terminal. At block 915, ephemeris data identifying a change in distance between the gateway and the satellite is received. At block 920, and in response to the received ephemeris data, transmission timing is adjusted for one or more signals of the first or second set to account for the change in distance between the gateway and the satellite.

Figure 10:
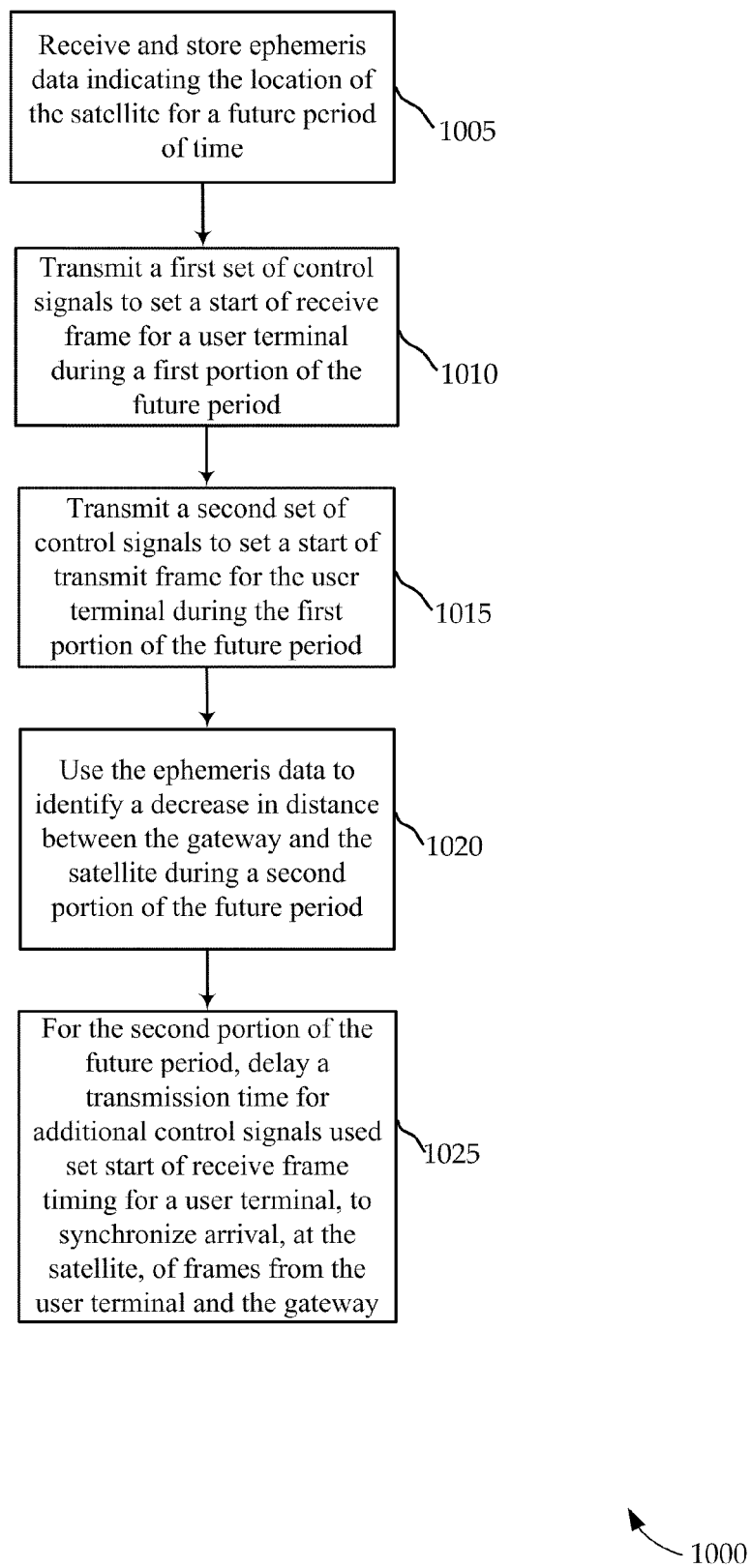
FIG. 10 is a flowchart illustrating a method 1000 of using ephemeris data for synchronizing a satellite communications system for mesh communications by delaying a transmission time for control signals to be used to set start of receive frame timing.

FIG. 10 is a flowchart illustrating a method 1000 of using ephemeris data for synchronizing a satellite communications system for mesh communications by delaying a transmission time for control signals to be used to set terminal start of receive frame timing, according to various embodiments of the invention. The method 1000 may, for example, be performed within the system 100 of FIG. 1 or system 200 of FIG. 2. The method 1000 may also be performed by the gateway 110 of FIG. 1 or 2 or, more specifically, by the configuration 700 illustrated in FIG. 7.

At block 1005, ephemeris data indicating the location of the satellite for a future period of time is received and stored. At block 1010, a first set of control signals is transmitted to set start of receive frame timing for a user terminal during a first portion of the future period. At block 1015, a second set of control signals is transmitted to set start of transmit frame timing for the user terminal during a first portion of the future period. At block 1020, the ephemeris data is used to identify a decrease in distance between the gateway and the satellite during a second portion of the future period. At block 1025, during the second portion of the future period, the transmission of additional control signals to set the start of receive frame timing for a user terminal is delayed, to thereby synchronize arrival at the satellite of frames from the user terminal and the gateway. Block 1025 may be performed in conjunction with setting an earlier start of receive frame time at the gateway to account for the earlier arrival time at the gateway of signals from the user terminal.

Figure 11:
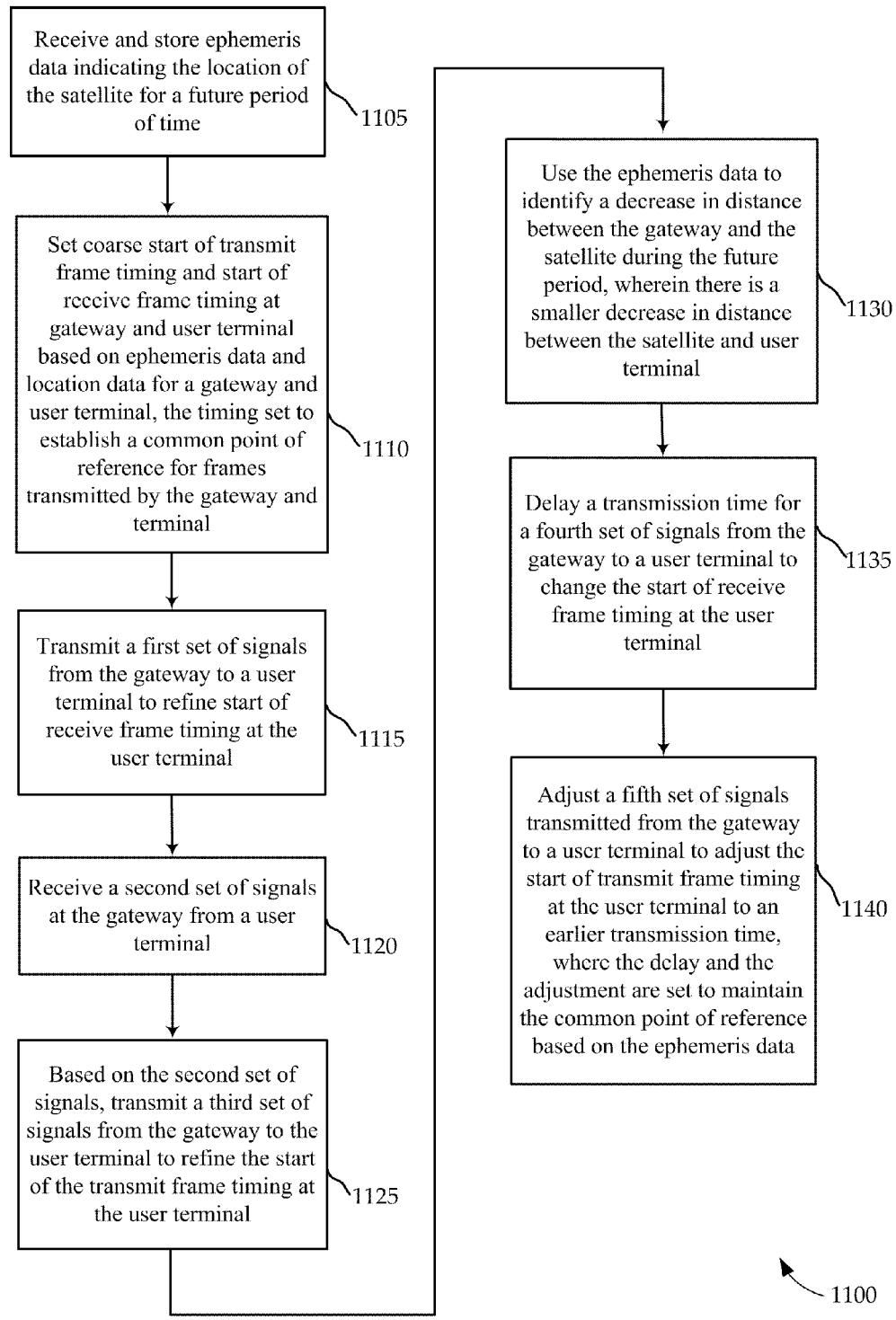
FIG. 11 is a flowchart illustrating a method of using ephemeris data for synchronizing a satellite communications system for mesh communications by adjusting transmission times for control signals to be used to set start of frame timing at a user terminal.

FIG. 11 is a flowchart illustrating a method 1100 of using ephemeris data for synchronizing a satellite communications system for mesh communications by adjusting transmission times for control signals to be used to set start of frame timing at a user terminal, according to various embodiments of the invention. The method 1100 may, for example, be performed within the system 100 of FIG. 1 or system 200 of FIG. 2. The method 1100 may also be performed by the gateway 110 of FIG. 1 or 2 or, more specifically, by the configuration 700 illustrated in FIG. 7.

At block 1105, ephemeris data indicating the location of the satellite for a future period of time is received and stored. At block 1110, coarse start of transmit frame timing and start of receive frame timing are set at the gateway and the user terminal based on ephemeris data and location data for a gateway and user terminal, the timing set to establish a common point of reference for frames transmitted by the gateway and the terminal.

At block 1115, a first set of signals is transmitted from the gateway to a user terminal to refine the start of receive frame timing at the user terminal. At block 1120, a second set of signals is received at the gateway from a user terminal. At block 1125, a third set of signals is transmitted from the gateway to the user terminal to refine the start of the transmit frame timing at the user terminal based on the arrival time of the second set of signals.

At block 1130, the ephemeris data is used to identify a decrease in distance between the gateway and the satellite during the future period, wherein there is a smaller decrease in distance between the satellite and the user terminal. At block 1135, a transmission time for a fourth set of signals is delayed from the gateway to a user terminal to change the start of receive frame timing at the user terminal. At block 1140, information in a fifth set of signals transmitted from the gateway to a user terminal is changed to adjust the start of transmit frame timing at the user terminal to an earlier time; based on the ephemeris data, wherein the delay (at block 1135) and the adjustment (at block 1140) are set to maintain the common point of reference.

II. Terminal Measurement Based Synchronization

Novel synchronization techniques for mesh satellite communications based on terminal measurements are described. In some embodiments, gateway signals (or other control signals from the gateway) may be used to set start of receive frame timing and start of transmit frame timing for the terminal. The distance between the satellite and the gateway may change. To address this issue, in one set of embodiments, various collections of terminal measurements may be used to modify such start of transmit frame and start of receive frame settings.

By way of example, consider a satellite communications system (e.g., the system 100 of FIG. 1 or system 200 of FIG. 2), including one or more user terminals and a gateway communicating via satellite. In such a system, a user terminal (e.g. user terminal 115) may transmit signals to the satellite, and then receive the signals from the satellite via a mesh communication link, performing a time measurement. The user terminal may then transmit the time measurement identifying a transmit time between the user terminal and the satellite (which may, for example, be a one way or round trip time from the user terminal to the satellite and back to the user terminal on the mesh link).

The gateway (e.g., gateway 110) may receive the time measurement identifying transmit time between the user terminal and the satellite. It may use the received time measurement to calculate a changed distance between the gateway and the satellite (e.g., by comparing it to measured transmit time between the gateway and user terminal). The gateway may then adjust, responsive to the change in distance between the gateway and the satellite, one or more control signals to be transmitted to set start of receive frame timing or start of transmit frame for the user terminal. The adjustment may be set to synchronize timing for mesh satellite communications.

Figure 12A:
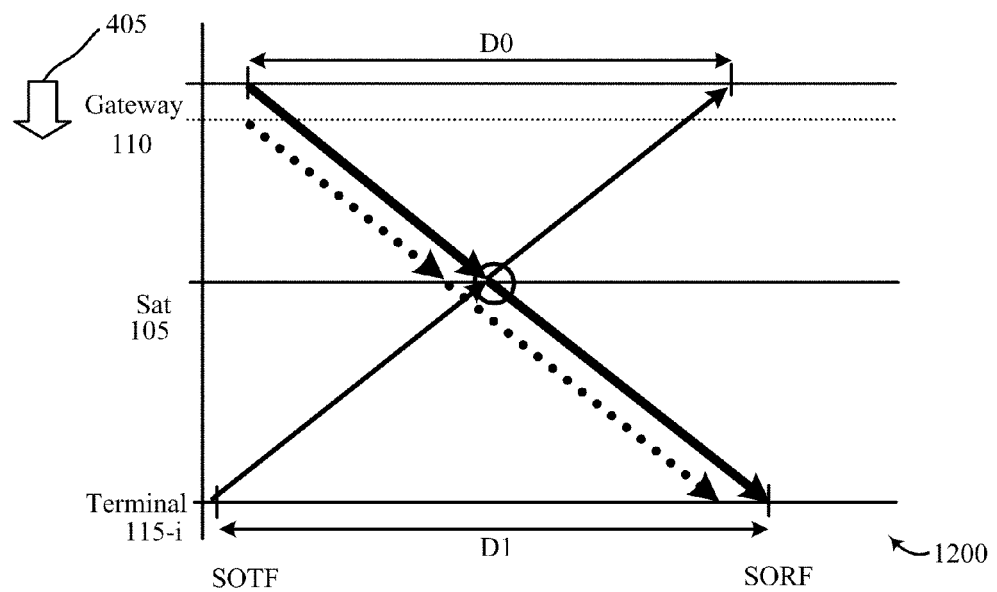
FIGS. 12A-12C are timing diagrams illustrating the use of terminal to satellite timing data to address synchronization issues according to various embodiments of the invention.

Referring next to FIG. 12A, a timing diagram 1200 illustrates how the timing issues may arise for synchronization with mesh communications. Assume that the gateway 110 and satellite 105 move 405 closer together by d μs, while the distance between the satellite 105 and the terminal 115-*i* do not change (as illustrated in FIG. 4A). In this instance, the gateway 110 signal arrives at terminal 115-*i* d μs earlier. The travel time for a terminal 115-*i* signal sent to itself via a mesh link would not change.

Figure 12B:
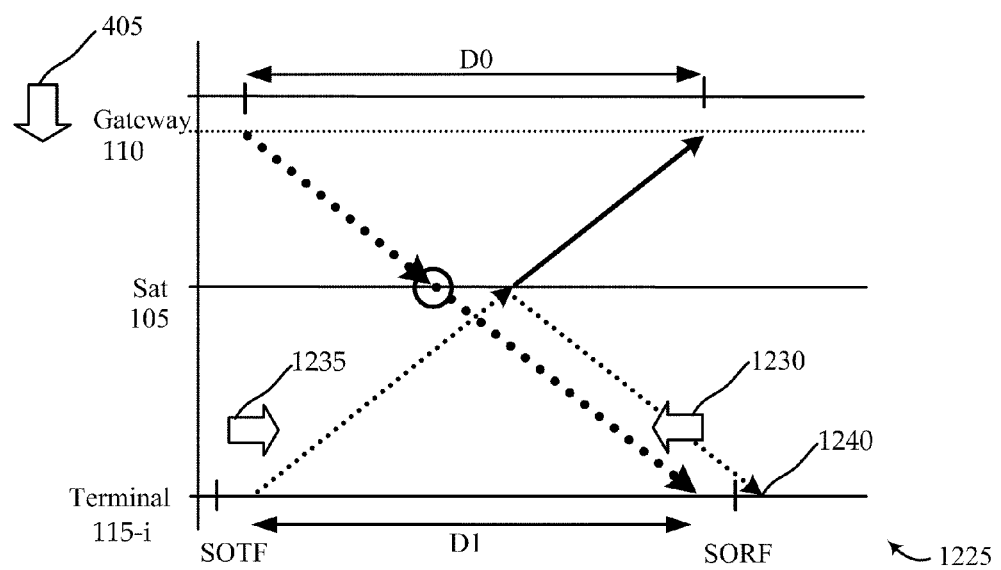

Continuing the discussion from FIG. 12A, and turning to FIG. 12B, a timing diagram 1225 illustrates the first stages of a synchronization operation which may produce timing errors. Terminal 115-*i* locally adjusts its SORF left 1230 by d μs, based on measurements of the signal received from the gateway 110, as would be done in prior art solutions. Gateway 110 measures the received timing of signals received from terminal 115-*i*, and sends control signals to direct terminal 115-*i* to move its SOTF right 1235 by d μs. However, mesh bursts would not be synchronized to the downstream signals for the gateway, as bursts transmitted by terminal 115-*i* received by terminal 115-*i* are late 1240 by 2d μs (as shown by the dashed line). All terminals 115 may experience this effect.

Figure 12C:
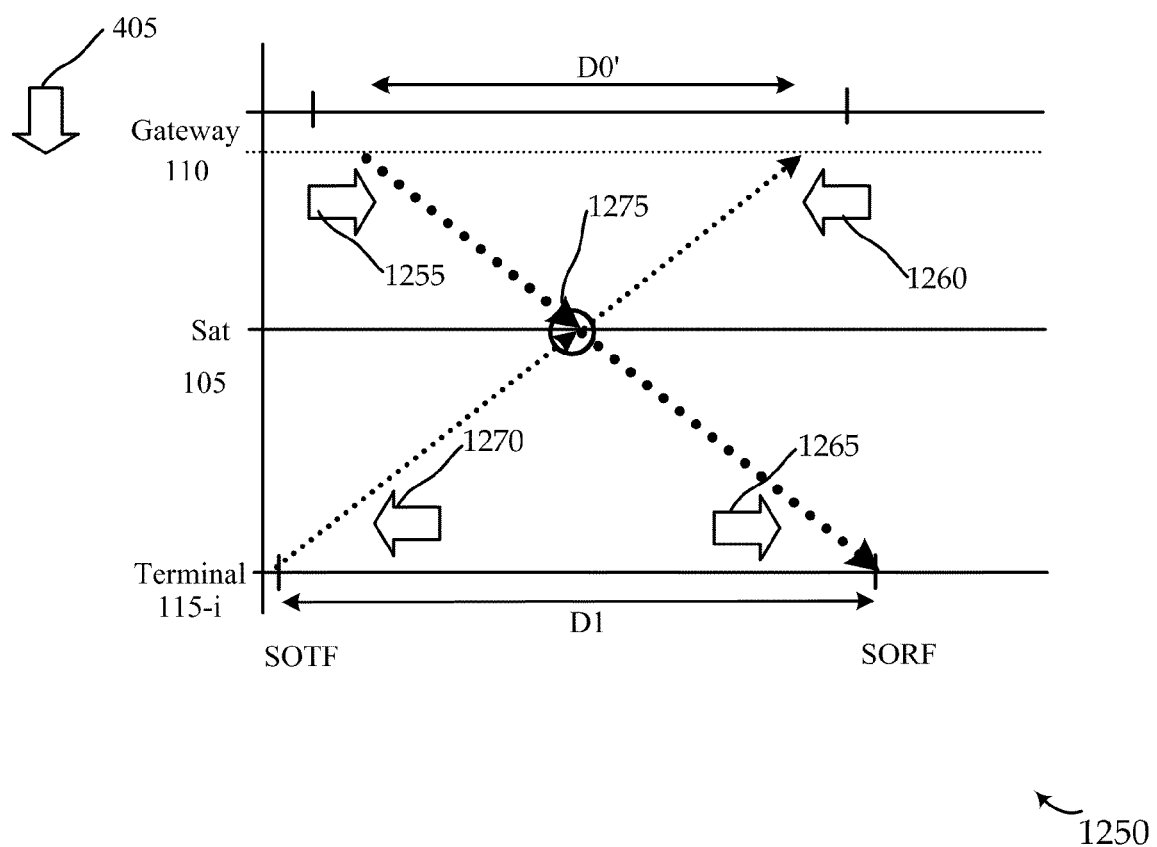

Continuing the discussion from FIG. 12B, and turning to FIG. 12C, a timing diagram 1250 illustrates how modified synchronization operations may avoid such timing errors in some embodiments. To address this issue, one or more terminals 115 may measure the timing and/or offset of received terminal to terminal bursts (e.g., the offset for terminal 115-*i* is 2d μs). The gateway 110 may be configured to collect such timing measurements and/or offsets from one or more terminals 115 (e.g., by querying terminals 115, or simply collecting information sent from terminals 115). The gateway 110 may average timing measurements and/or offset values for the collected measurements, and compute d μs. The gateway 110 may then attempt to realign the burst timing at the satellite 105 with the downstream signal at the satellite 105. To do so, in one embodiment, the gateway 110 moves its SOTF right 1255 by d μs, and moves its SORF left 1260 by d μs. Terminal 115-*i* would then locally adjust its SORF right 1265 by d μs, based on measurements of the signal received from the gateway 110. Gateway 110 measures the received timing of signals received from terminal 115-*i*, and sends control signals to direct terminal 115-*i* to move its SOTF left 1270 by d μs. The burst timing at the satellite 105 would thereby be realigned 1275 with the downstream signal at the satellite 105.

Figure 13A:
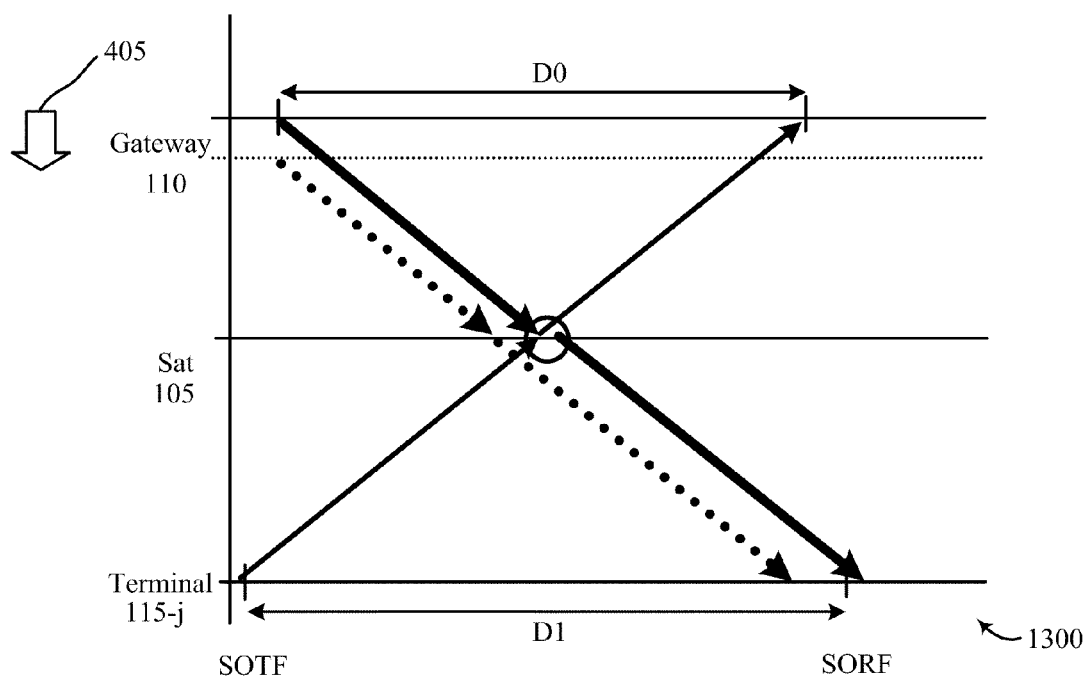
FIGS. 13A-13C are timing diagrams illustrating the use of terminal to satellite timing data to address synchronization issues according to various embodiments of the invention.

Referring next to FIG. 13A, a timing diagram 1300 again illustrates certain issues that may arise for synchronization with mesh communications. Assume that the gateway 110 and satellite 105 move 405 closer together by d μs, while the distance between the satellite 105 and the terminal 115-*j* do not change (as illustrated in FIG. 4A). In this instance, the gateway 110 signal arrives at terminal 115-*j* d μs earlier. The travel time for a terminal 115-*i* signal sent to itself via a mesh link would not change.

Figure 13B:
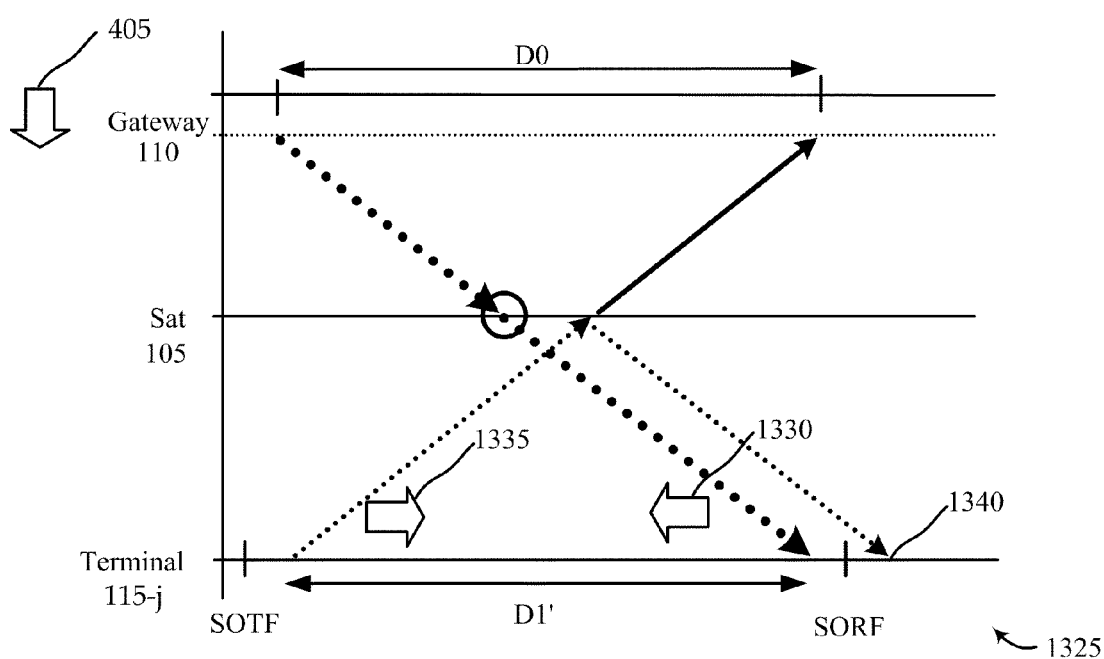

Continuing the discussion from FIG. 13A, and turning to FIG. 13B, a timing diagram 1325 illustrates the first stages of a synchronization operation which could produce timing errors. Assume terminal 115-*j* locally adjusts its SORF left 1330 by d μs, based on measurements of the signal received from the gateway 110, as would be done in prior art solutions. Gateway 110 measures the received timing of signals received from terminal 115-*j*, and sends control signals to direct terminal 115-*j* to move its SOTF right 1335 by d μs. However, mesh bursts would not be synchronized to the downstream signals for the gateway, as bursts transmitted by terminal 115-*j* received by terminal 115-*j* are late 1340 by 2d μs (as shown by the dashed line). All terminals 115 may experience this effect.

Figure 13C:
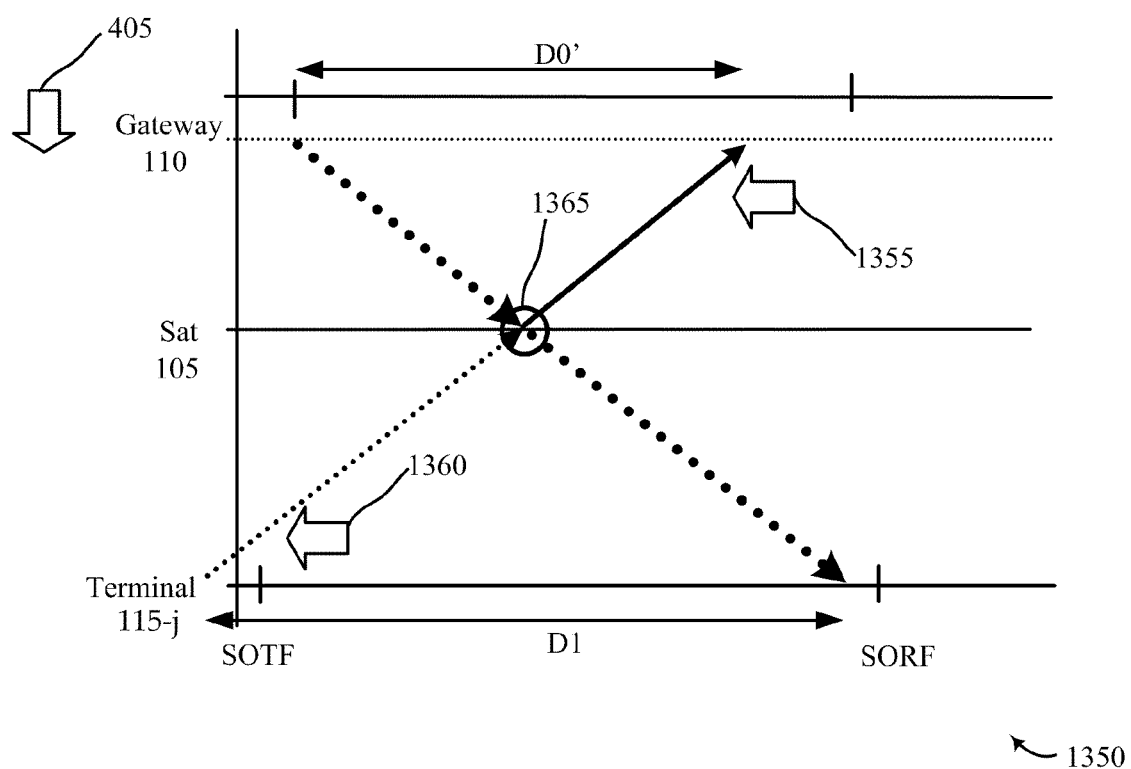

Continuing the discussion from FIG. 13B, and turning to FIG. 13C, a timing diagram 1350 illustrates how modified synchronization operations may avoid timing errors in some embodiments. To address this issue, one or more terminals 115 may perform time measurements and/or offset measurements of received terminal to terminal bursts (e.g., the offset for terminal 115-*j* 2d μs). The gateway 110 may be configured to collect one or more of such time measurements and/or offsets from one or more terminals 115 (e.g., by querying terminals 115, or simply collecting information sent from terminals 115). The gateway 110 may average these values for the collected measurements and compute d μs. The gateway 110 may then attempt to realign the burst timing at the satellite 105 with the downstream signal at the satellite 105. To do so, the gateway 110 does not move its SOTF, and instead moves its SORF left 1355 by 2d μs based on the collected measurements. Terminal 115-*j* would not need to locally adjust its SORF, as based on measurements of the signal received from the gateway 110 the timing remains synchronized. However, gateway 110 measures the received timing of signals received from terminal 115-*j*, and sends control signals to direct terminal 115-*j* to move its SOTF left 1360 by 2d µs (to compensate for the gateway SORF move left 1355 by 2d µs). The burst timing at the satellite 105 would thereby be realigned 1365 with the downstream signal at the satellite 105. This is a variation on the synchronization set forth in FIGS. 7A-7C.

The terminal 115 measurement for the synchronization described with reference to FIGS. 12C and 13C may be processed by the gateway 110, a master terminal 115, or other device or set of devices. A variety of other schemes may be used with the collected terminal 115 measurements to adjust the timing for mesh communications. It is also worth noting the processing and adjustments related to the collected terminal 115 measurements may be performed by the gateway frame timing module 245 and/or terminal frame timing module 220 of FIG. 2, and be used in the system 100 of FIG. 1, to achieve the synchronization of burst mesh communications with the downstream signal of the gateway 110. Also, in lieu of or in addition to the terminal 115 offset measurement, the gateway 110 or terminal 115 may perform timing operations (e.g., various ping operations) on transmissions to the satellite, and the principles discussed with reference to FIGS. 12C and 13C may be applied thereto. As used hereinafter, the term "time measurement" for terminal-to-terminal bursts may include round-trip time, one way time, or simply the offset time, as well as any number of other schemes as evident to those skilled in the art.

Figure 14:
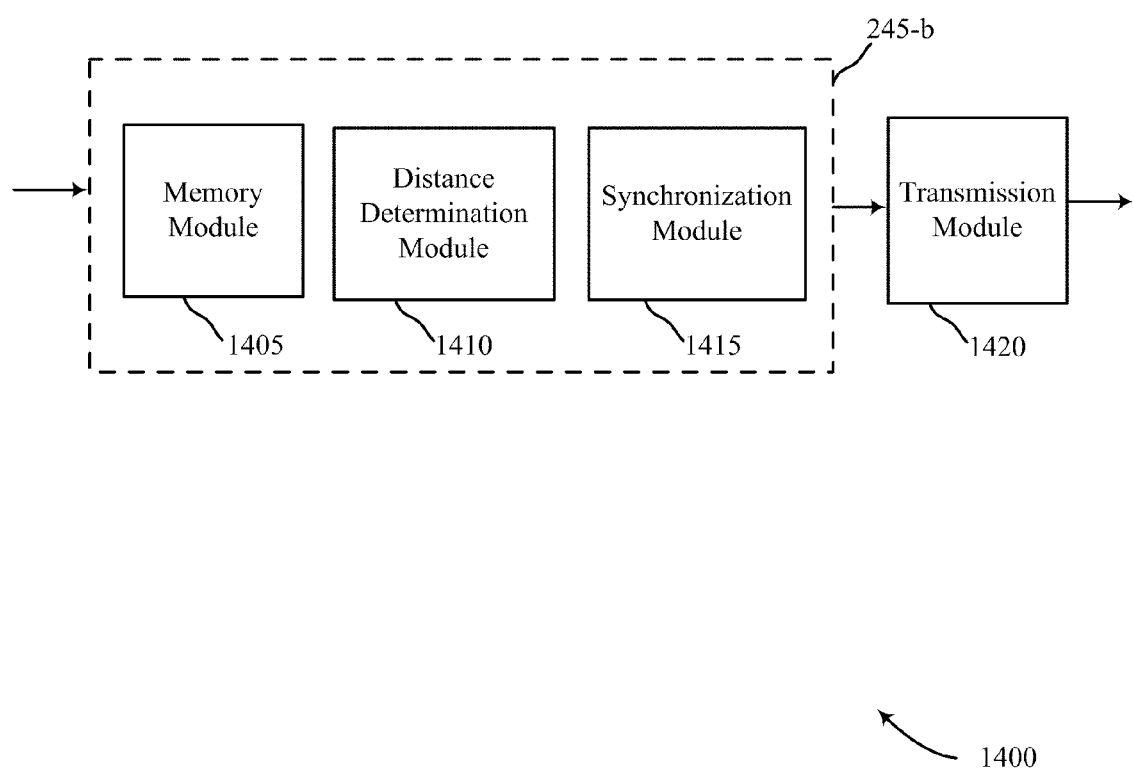
FIG. 14 is a block diagram illustrating components of one or more devices using terminal to satellite timing data for mesh synchronization in a satellite communications system according to various embodiments of the invention.

Turning to FIG. 14, a block diagram is shown illustrating an example configuration 1400 of a gateway timing module 245-*b* and a transmission module 1420 that may provide for synchronized mesh satellite communications according to various embodiments of the invention. This configuration 1400 may be implemented in the gateway 110 of FIG. 1 or 2. These modules 245-*a* and 1420 may, therefore, be the gateway frame timing module 245, data link layer processing module 240, and RF frontend 235 in the gateway 110 of FIG. 2. However, some or all of the functionality of these modules may be implemented in other devices or sets of devices.

The illustrated embodiment includes a memory module 1405, a distance determination module 1410, a synchronization module 1415, and a transmission module 1420. The memory module 1405, distance determination module 1410, and synchronization module 1415 may together make up the gateway timing module 245-*b*.

The memory module 1405 may receive and store a first time measurement corresponding to a transmit time between the user terminal and the satellite (e.g., the time measurement may be received via the satellite from the user terminal, and may be a one way or round trip time). The memory module 1405 may receive and store a second time measurement corresponding to a transmit time between the gateway and the user terminal via the satellite (e.g., the time measurement may be measured at the gateway or user terminal, and may be a one way or round trip time). The memory module 1405 may also be configured to store other location data for the satellite, user terminal, or gateway, reflecting real-time or forward looking location data. This location data may include latitude, longitude, altitude, and any other information indicating the spatial position.

The distance determination module 1410 may use the timing measurements and the stored location data to determine respective positions for the user terminal, gateway, and satellite. These may be the user terminal 115, gateway 110, and satellite 105 of FIG. 1 or 2. During a first phase, the synchronization module 1415 may use the timing measurements and location data for a gateway and user terminal to set coarse start of transmit frame timing and start of receive frame timing at the gateway and the user terminal, and then perform refinements as described above. The timing may be set to establish a common point of reference at the satellite for frames transmitted by the gateway and the user terminal.

The distance determination module 1410 may be configured to calculate a changed distance between the gateway and the satellite based at least in part on a series of the first and second timing measurements (e.g., by comparing the first and second time measurement at different times). The synchronization module 1415 may be configured to adjust, responsive to the change in distance between the gateway and the satellite, one or more control signals to be transmitted to set start of receive frame timing and/or set start of transmit frame timing for the user terminal. The adjustments may be made to synchronize timing for mesh satellite communications, setting or maintaining a common point of reference at the satellite. The transmission module 1420 may be configured to transmit the adjusted one or more signals.

Figure 15:
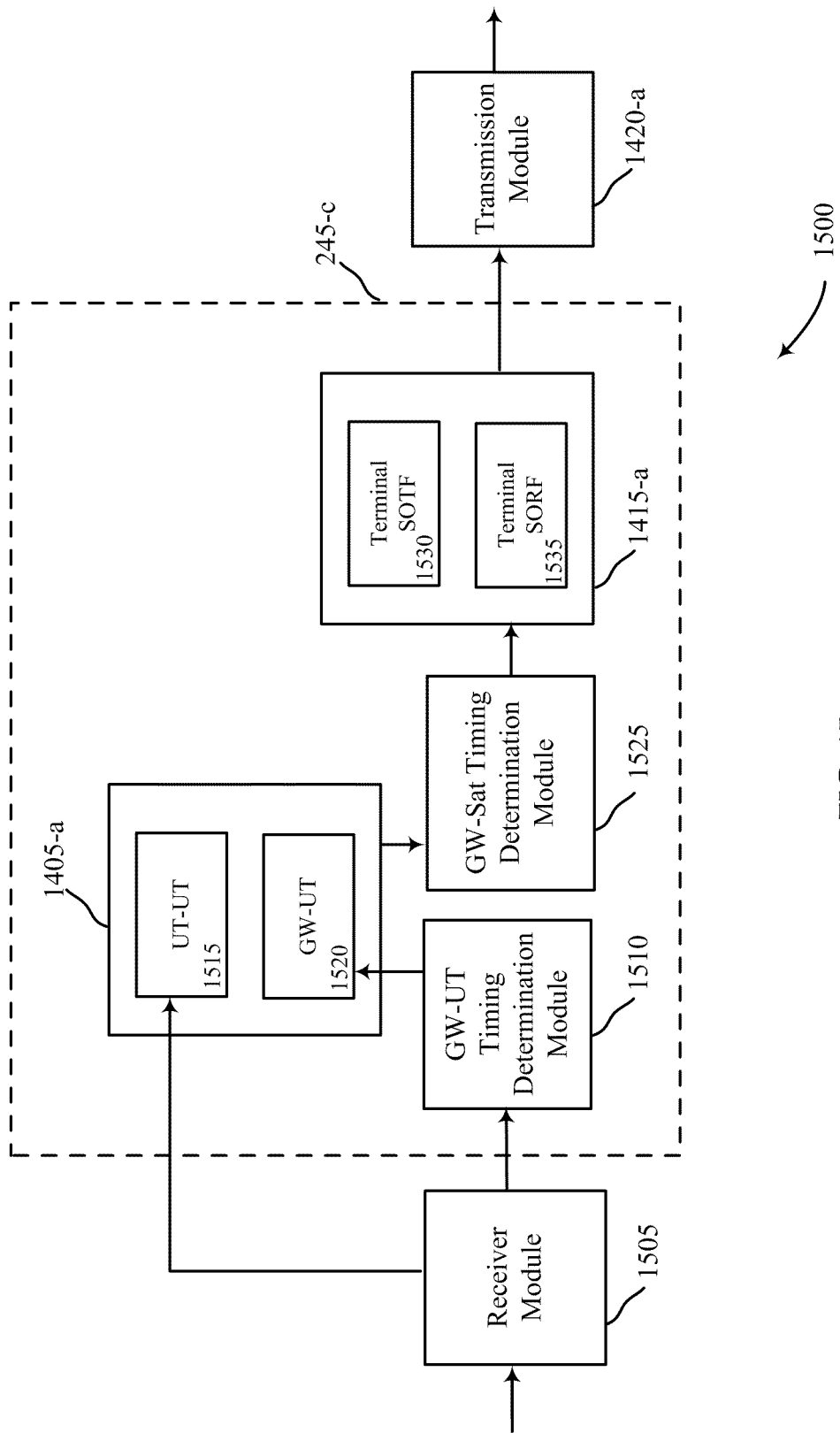
FIG. 15 is a block diagram illustrating an alternative configuration of components of one or more devices using terminal to satellite timing data for mesh synchronization in a satellite communications system according to various embodiments of the invention.

Turning to FIG. 15, a block diagram is shown illustrating an example configuration 1500 of a receiver module 1505, a gateway timing module 245-*c*, and a transmission module 1420-*a* that may provide synchronization for mesh satellite communications according to various embodiments of the invention. This configuration 1500 may be the configuration 1400 of FIG. 14, and may be implemented in the gateway 110 of FIG. 1 or 2. However, some or all of the functionality of these modules may be implemented in other devices or sets of devices.

The receiver module 1505 may receive, from the user terminal, a first time measurement corresponding to the transmit time between the user terminal and the satellite, the first time measurement calculated by the user terminal. This first time measurement may be stored in UT-UT table 1515 of the memory module 1405-*a* in the synchronization module 245-*c*. This UT-UT table 1515 of the memory module 1405-*a* may store additional time measurements, received from a number of additional user terminals, corresponding to the transmit time between each respective user terminal and the satellite.

The receiver module 1505 may also receive round trip or other signals from the user terminal. Using these signals, a GW-UT timing determination module 1510 may perform a second time measurement corresponding to the transmit time between the user terminal and the gateway (which may be a one way or round trip transit time). This second time measurement may be stored in GW-UT table 1520 of the memory module 1405-*a*.

A GW-Sat timing determination module 1525 may receive and compare the first time measurement to the second time measurement from the memory module 1405-*a*, and use the comparison to calculate a changed distance between the gateway and the satellite based at least in part of the first and second timing measurements. The calculation of a changed distance may be a time or distance metric, as evident to those skilled in the art. Once the changed distance between the gateway and is calculated, the synchronization module 1415-*a* may be configured to adjust, responsive to the change in distance between the gateway and the satellite, one or more control signals to be transmitted to set a start of receive frame timing and/or set a start of transmit frame timing for the user terminal. The synchronization module 1415-*a* may include a terminal SOTF module 1530 to generate control signals to set a start of transmit frame timing for the user terminal, and a terminal SORF module 1535 to generate control signals to set start of receive frame timing at the user terminal. The adjusted signals may be transmitted to the user terminal by the transmission module 1420-*a*.

As referenced above, the GW-Sat timing determination module 1525 may identify an increase or a decrease in distance between the gateway and the satellite. There may also be a related increase or decrease in distance between the satellite and the user terminal. As noted above, there may be issues when the changes in distance differ. Thus, in one set of embodiments, the synchronization module 1415-*a* is configured to signal a change to the start of transmit frame timing and/or the start of receive frame timing at the user terminal or gateway when there is a differential in the changes in distances. In other embodiments, the synchronization module 1415-*a* is configured to signal a change to the start of transmit frame timing and/or the start of receive frame timing at the user terminal or gateway when there is simply a change in distance between the gateway and the satellite. The adjustment to the start of transmit frame timing may be set by the terminal SOTF module 1530 and the adjustment to the start of receive frame timing may be set by the terminal SORF module 1535. The synchronization module 1415-*a* may coordinate the changes to create a common point of reference and thereby maintain or set up a synchronized arrival, at the satellite, of frames or other signals transmitted from the user terminal and the gateway. This coordination may set up synchronization at the satellite for mesh satellite communications.

To account for the change in distance between the gateway and the user terminal, the terminal SORF module 1535 may generate a set of control signals to be transmitted by transmission module 1420-*a* to a user terminal to change the start of receive frame timing at the user terminal. The adjustment may be to set earlier start of receive frame timing (e.g., in the event that the gateway to satellite distance decreases), later start of receive frame timing (e.g., in the event that the gateway to satellite distance decreases), or simply maintain current start of receive frame timing. This set of control signals may be sent to all, or a subset, of the downstream terminals. Each user terminal may use the receive time of the transmitted signals to set start of receive frame timing at the user terminal. In such cases, the set of control signals may simply be a standard downstream broadcast transmission. Alternatively, control signals may be formatted with the specific information directing the user terminal in setting or adjusting receive frame timing at the receiving user terminal. In other embodiments, other forms of control signals may be used.

To account for the change in distance between the gateway and the user terminal, the terminal SOTF module 1530 may generate an adjusted set of control signals to be transmitted by transmission module 1420-*a* to a user terminal to change the start of transmit frame timing at the user terminal. A set of signals may initially be transmitted from the user terminal according to a current start of transmit frame timing setting at the user terminal, the set of signals transmitted to the gateway via satellite. The configuration 1500 or, more specifically, the terminal SOTF module 1530 (e.g., integrated into the gateway), may use the receive time of the signals from the user terminal, along with changed distance information from the measurement data, to determine an adjustment to the start of transmit frame timing (which may be earlier, later, or same timing) at the user terminal. Therefore, components of the synchronization module 1415-*a* may generate an adjusted set of control signals with information to change or maintain the start of the transmit frame timing at the user terminal based on the information in the adjusted set of control signals. This adjusted set may be transmitted to the user terminal by transmission module 1420-*a*. The refinements may be set to establish a common point of reference at the satellite for frames transmitted by the gateway and the user terminal, to allow for mesh satellite communications.

It is again worth noting that the synchronization module 1415-*a* may make the changes to the start of transmit frame timing and start of receive frame timing at the user terminal to create a common point of reference and thereby maintain (or set up) a synchronized arrival, at the satellite, of frames or other signals transmitted from the user terminal and the gateway. This may be done to allow for mesh communications to be facilitated within a star communications system.

It is also worth noting that, in certain embodiments, the start of transmit frame timing at the gateway corresponds to the start of receive frame timing at the user terminals. Similarly, the start of transmit frame timing at the user terminals may correspond to the start of receive frame timing at the gateway. Therefore, while much of the discussion above relates to control signals sent by the gateway to change timing at the user terminal, note that there may in these embodiments be corresponding changes to the start of transmit frame and start of receive frame timing at the gateway (e.g., a later start of transmit frame timing at the user terminal may correspond to a later start of receive frame timing at the gateway, or an earlier start of receive frame timing at the user terminal may correspond to an earlier start of transmit frame timing at the gateway). However, in some instances, timing changes may occur at the gateway (either in the start of transmit frame timing or start of receive frame timing, or both) in order to maintain timing at the user terminal (either in the start of transmit frame timing or start of receive frame timing, or both). This may be reversed, as well. This may be done to create a common point of reference at the satellite and thereby maintain (or set up) a synchronized arrival, at the satellite, of frames (or other signals) transmitted from the user terminal and the gateway.

The modules illustrated in FIG. 14 and FIG. 15 may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 16:
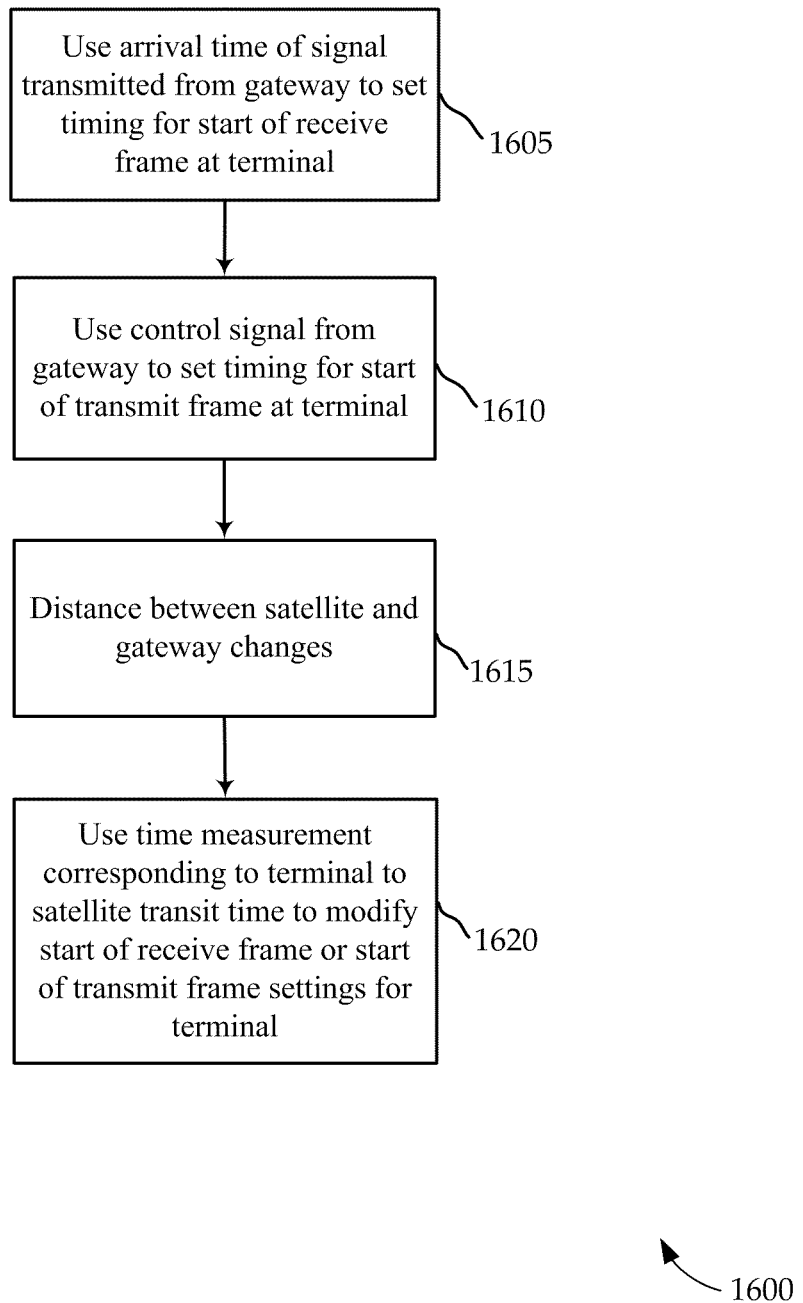
FIG. 16 is a flowchart illustrating a method of using terminal to satellite timing data to provide for synchronized mesh satellite communications according to various embodiments of the invention.

FIG. 16 is a flowchart illustrating a method 1600 of using terminal to satellite timing data to provide for synchronized mesh satellite communications according to various embodiments of the invention. The method 1600 may, for example, be performed within the system 100 of FIG. 1 or system 200 of FIG. 2.

At block 1605, the arrival time of a signal transmitted from the gateway is used to set the start of receive frame timing at the terminal. At block 1610, a control signal transmitted from the gateway is used to set the start of transmit frame timing at the terminal. At block 1615, the distance between the satellite and the gateway changes. At block 1620, a time measurement corresponding to the terminal to satellite transit time is used to modify the start of receive frame or the start of transmit frame settings for the terminal. The time measurement corresponding to the terminal to satellite transit time may be subtracted from the terminal to gateway transmit time to establish the gateway to satellite transmit time. The gateway to satellite transmit time may be used to set a common reference point for frames from the terminal and the gateway at the satellite, and thereby facilitate mesh communications.

Figure 17:
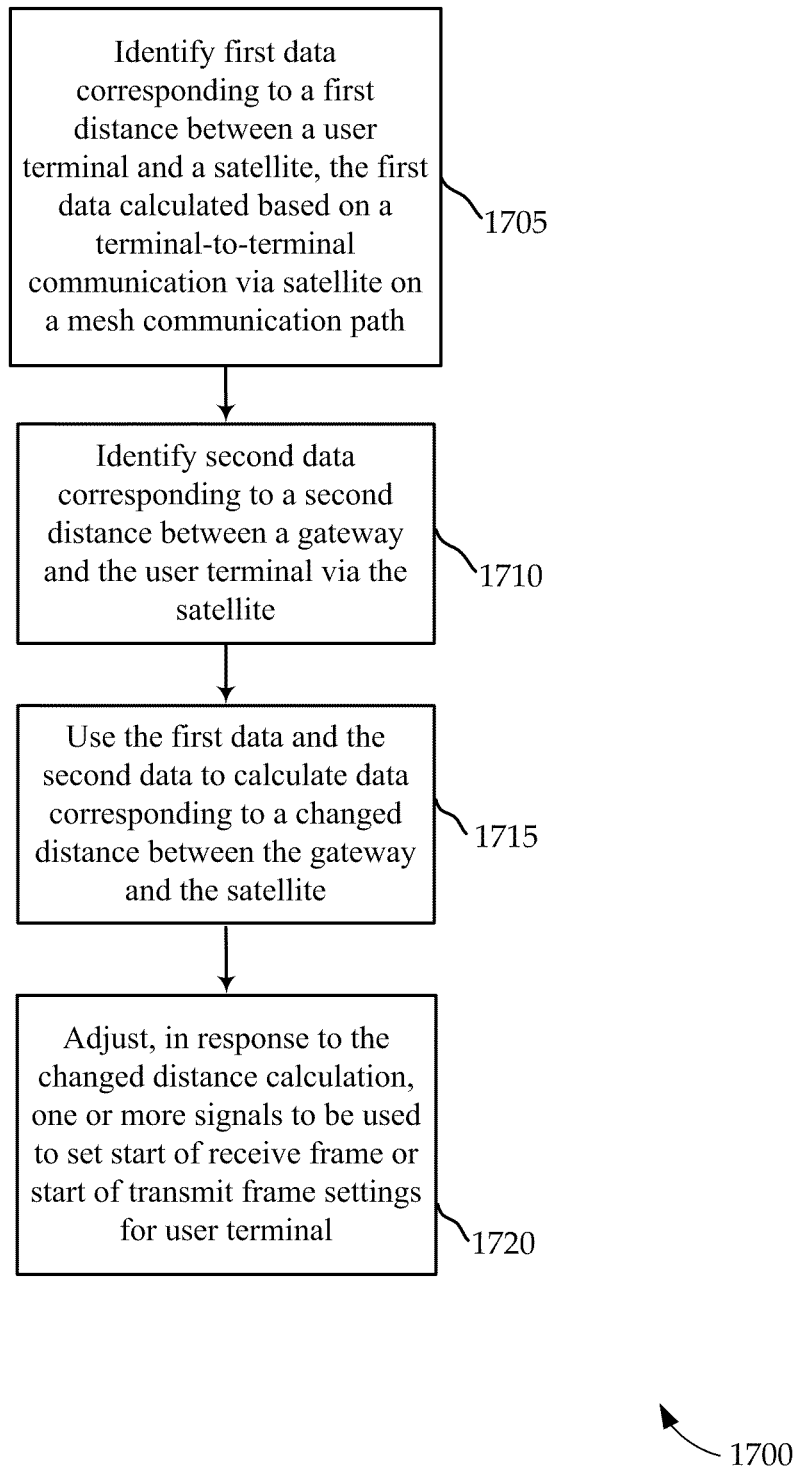
FIG. 17 is a flowchart illustrating a method of calculating a changed distance between a gateway and satellite to synchronize a satellite communications system for mesh communications according to various embodiments of the invention.

FIG. 17 is a flowchart illustrating a method 1700 of calculating a changed distance between a gateway and satellite for synchronizing a satellite communications system for mesh communications according to various embodiments of the invention. The method 1700 may, for example, be performed within the system 100 of FIG. 1 or system 200 of FIG. 2. The method 1700 may also be performed by the gateway 110 of FIG. 1 or 2 or, more specifically, by the configuration 1400 illustrated in FIG. 14 or configuration 1500 illustrated in FIG. 15.

At block 1705, first data is identified corresponding to a first distance between a user terminal and a satellite, the first data calculated based on a terminal-to-terminal communication via satellite on a mesh communication path. At block 1710, second data is identified corresponding to a second distance between a gateway and the user terminal via the satellite. The first data and the second data may be time and/or distance measurements, or in some embodiments may be other metrics. At block 1715, the first data and the second data are used to calculate data corresponding to a changed distance between the gateway and the satellite. At block 1720, one or more signals to set start of receive frame or start of transmit frame settings for the user terminal are adjusted, the adjustment in response to the calculated data.

Figure 18:
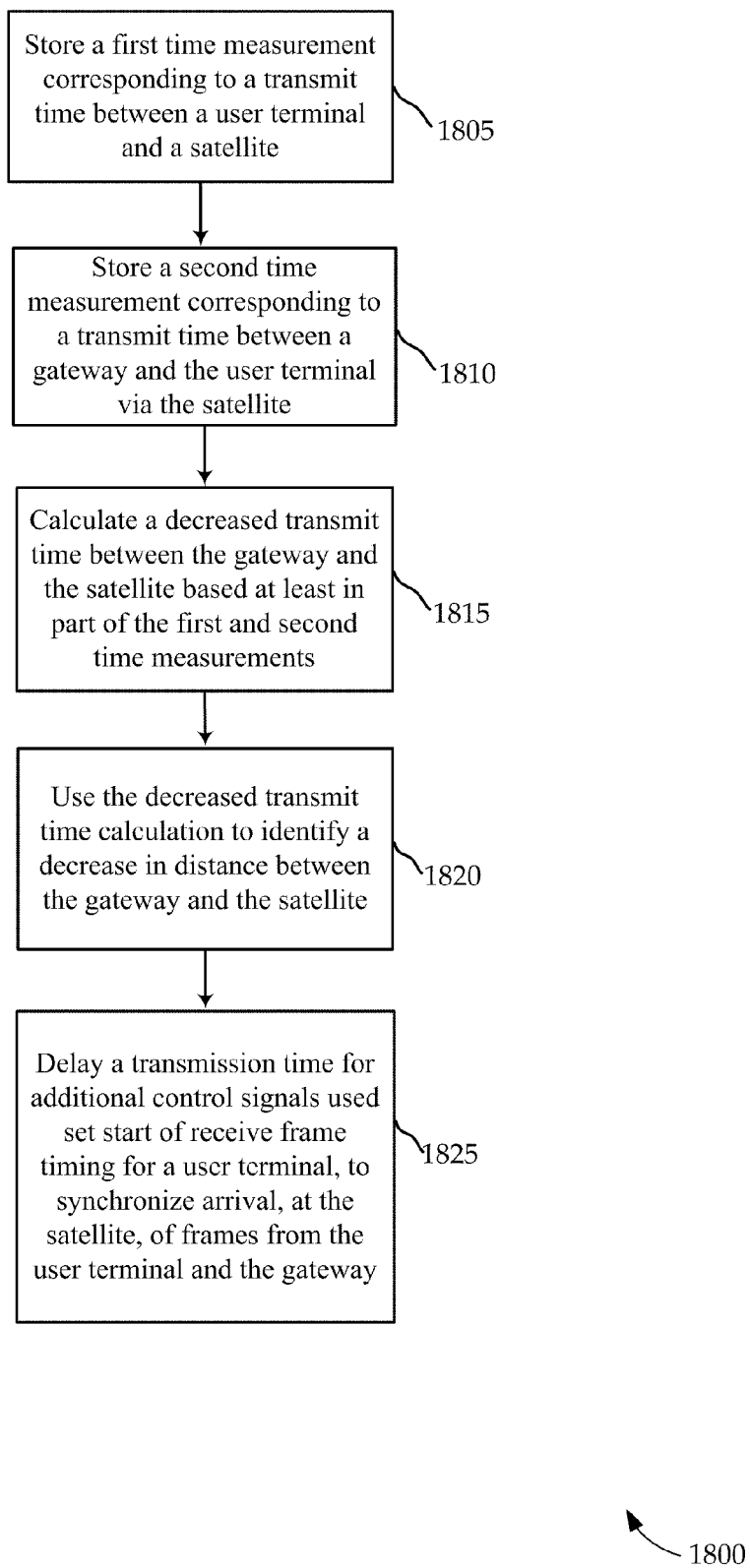
FIG. 18 is a flowchart illustrating a method of calculating a changed transmit time between a gateway and satellite to synchronize the system for mesh communications according to various embodiments of the invention.

FIG. 18 is a flowchart illustrating a method 1800 of calculating a changed transmit time between a gateway and satellite for purposes of synchronizing a satellite communications system for mesh communications according to various embodiments of the invention. The method 1800 may, for example, be performed within the system 100 of FIG. 1 or system 200 of FIG. 2. The method 1800 may also be performed by the gateway 110 of FIG. 1 or 2 or, more specifically, by the configuration 1400 illustrated in FIG. 14 or configuration 1500 illustrated in FIG. 15.

At block 1805, a first time measurement corresponding to a transmit time between the user terminal and the satellite is stored. At block 1810, a second time measurement corresponding to a transmit time between the gateway and the user terminal via the satellite is stored. At block 1815, a decreased transmit time between the gateway and the satellite is calculated based at least in part of the first and second time measurements. At block 1820, the decreased transmit time calculation is used to identify a decrease in distance between the gateway and the satellite. At block 1825, a transmission time is delayed for additional control signals used to set start of receive frame timing for the user terminal, to thereby synchronize arrival at the satellite of frames from the user terminal and the gateway.

Figure 19:
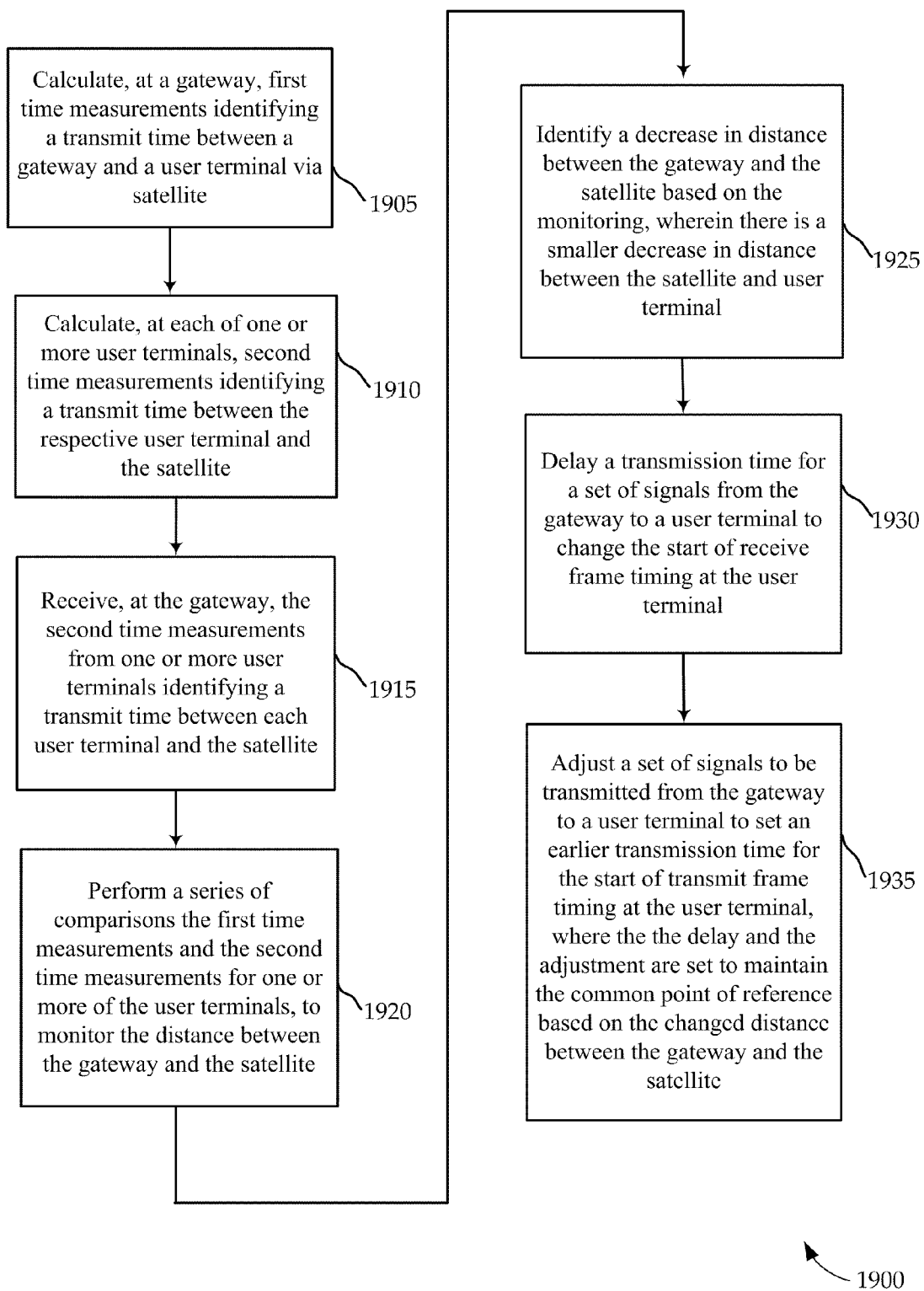
FIG. 19 is a flowchart illustrating a method of calculating a changed distance between a gateway and satellite, the changed distance used for synchronizing a satellite communications system for mesh communications according to various embodiments of the invention.

FIG. 19 is a flowchart illustrating a method 1900 of calculating a changed distance between a gateway and satellite, the changed distance used for synchronizing a satellite communications system for mesh communications according to various embodiments of the invention. The method 1900 may, for example, be performed within the system 100 of FIG. 1 or system 200 of FIG. 2. The method 1900 may also be performed by the gateway 110 of FIG. 1 or 2 or, more specifically, by the configuration 1400 illustrated in FIG. 14 or configuration 1500 illustrated in FIG. 15.

At block 1905, first time measurements identifying a transmit time between a gateway and one or more user terminals via a satellite are calculated at the gateway. At block 1910, each user terminal calculates second time measurements identifying a transmit time between each respective user terminal and the satellite. At block 1915, the second time measurements from each of the one or more user terminals are received at the gateway via transmissions from the user terminals.

At block 1920, a series of comparisons are performed between the first time measurements and the second time measurements for one or more of the user terminals to monitor the distance between the gateway and the satellite. At block 1925, a decrease in distance between the gateway and the satellite is identified based on the monitoring, wherein there is a smaller decrease in distance between the satellite and user terminal. At block 1930, a transmission time is delayed for a set of signals transmitted from the gateway to a user terminal and used to change the start of receive frame timing at the user terminal. At block 1935, an adjustment is made for a set of signals to be transmitted from the gateway to a user terminal, the adjustment made to set an earlier transmission time for the start of transmit frame timing at the user terminal, where the delay (at block 1930) and the adjustment (at block 1935) are set to maintain a common point of reference for transmission to the satellite, based on the changed distance between the gateway and the satellite.

III. Terminal Self-Synchronization for Mesh Satellite Communications

Novel synchronization techniques for mesh satellite communications using terminal self-synchronization are described. In some embodiments, various gateway signals may be used at a terminal to set start of receive frame timing for communications from the gateway and set start of transmit frame timing for the terminal for communications to the gateway and to other terminals. The distance between the satellite and the gateway may change. To address this issue, in one set of embodiments, a terminal self-synchronization process may be used to modify start of receive frame settings for mesh communications received from the other terminals.

By way of example, consider a satellite communications system (e.g., the system 100 of FIG. 1 or system 200 of FIG. 2), including one or more user terminals and a gateway communicating via satellite. In such a system, a gateway (e.g., gateway 110) may transmit a first set of signals to set start of receive frame timing for a user terminal for communications from the gateway. The gateway may transmit a second set of signals to set a start of transmit frame timing for the user terminal for communications to the gateway and communications to other user terminals.

The user terminal (e.g., user terminal 115) may receive (via satellite) and use the first set of signals to set start of receive frame timing for communications received at the user terminal from the gateway. The user terminal may receive (via satellite) and use the second set of signals to set a start of transmit frame timing for the user terminal for communications to the gateway and communications to other user terminals via the satellite. The user terminal may receive and use a third set of signals to set start of receive frame timing for mesh communications received at the user terminal from other user terminals via the satellite.

In some embodiments, therefore, the gateway may maintain its start of receive frame and start of transmit frame settings, even in the face of a change in distance between the gateway and satellite. The gateway will, instead, transmit control signals to the user terminals that will adjust the relevant start of receive frame and start of transmit frame settings at the user terminal. The user terminal will, in such embodiments, use terminal to terminal bursts to set start of receive frame timing for mesh communications.

Figure 20A:
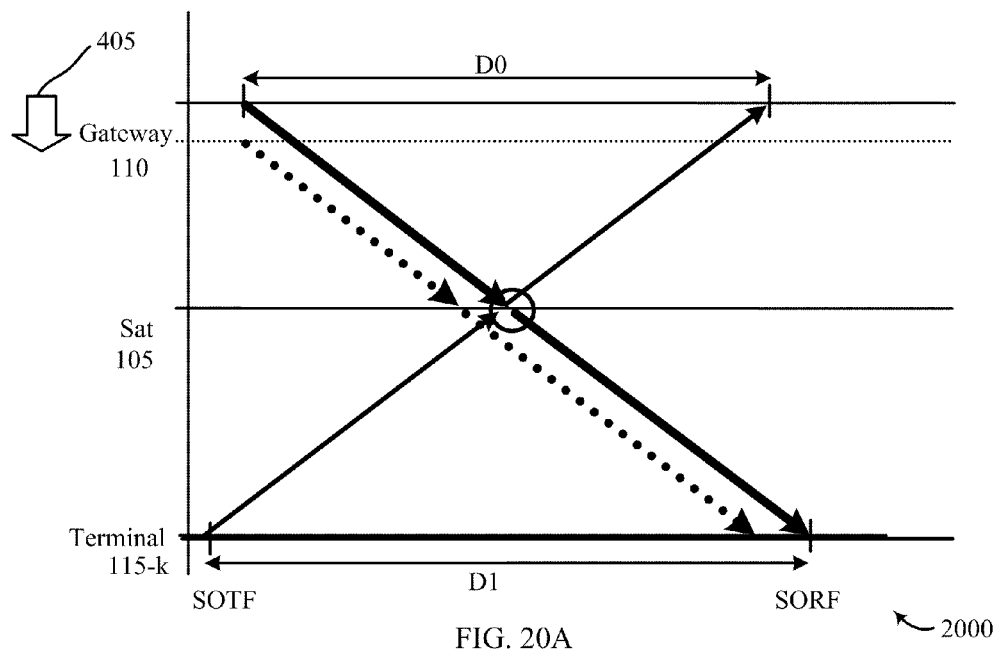
FIGS. 20A-20B are timing diagrams illustrating the use of a master terminal to set start of receive frame timing for mesh satellite communications according to various embodiments of the invention.

Referring next to FIG. 20A, a timing diagram 2000 again illustrates issues that may arise for synchronization with mesh communications. Assume that the gateway 110 and satellite 105 move 405 closer together by d µs, while the distance between the satellite 105 and the terminal 115-$k$ does not change (as illustrated in FIG. 4A). In this instance, the gateway 110 signal arrives at terminal 115-$k$ d µs earlier. The travel time for a terminal 115-$k$ signal sent to itself via a mesh link would not change.

Figure 20B:
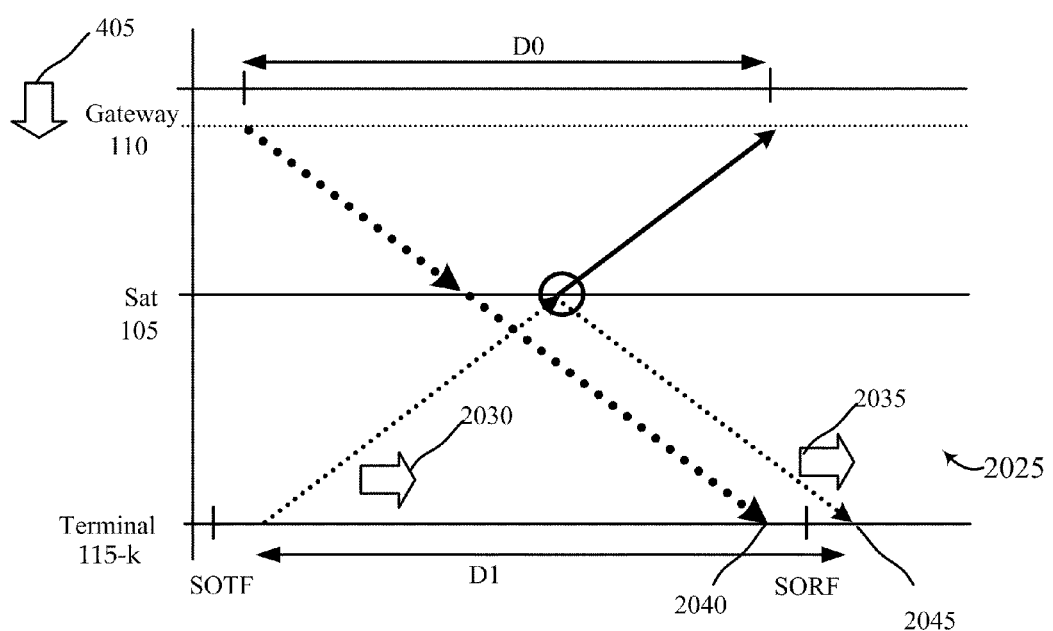

Continuing the discussion from FIG. 20A, and turning to FIG. 20B, a timing diagram 2025 illustrates how modified synchronization operations may avoid timing errors in some embodiments. In one embodiment, gateway 110 does not make any local adjustments to its SOTF or SORF timing. Gateway 110 measures the received timing of signals received from terminal 115-$k$, and sends control signals to direct terminal 115-$k$ to move its SOTF right 2030 by d µs. As directed, terminal 115-$k$ makes a correction (note that in other embodiments, the correction 2030 may be based on other correction schemes). Terminal 115-$k$ moves its SOTF right 2030 by d µs.

Terminal 115-$k$ may then track SORF mesh timing based on the arrival of a special mesh burst from another terminal 115. This monitored burst may be a special, modified terminal to terminal burst, and not the gateway 110 signal. This burst is transmitted in accordance with SOTF timing for the terminal 115-$k$ return link (as modified). By way of example, it may be arranged for one terminal to serve as a "master terminal" for mesh communications, and periodically transmit this special broadcast burst, which may then be received by all other mesh terminals 115. All the receiving mesh terminals 115 may then adjust 2035 their SORF timing for mesh communications off this burst. This designation may be made by gateway 110 or by devices other than the gateway 110, or may be set in advance. Alternatively, it may be made dynamically based on signal strength or other factors. This differs from certain embodiments described above, where the mesh timing is achieved by synchronization with the downstream gateway transmissions. Note, therefore, that a terminal 115-$k$ may have two distinct SORF times: one 2040 for the downstream transmissions from the gateway 110 and one 2045 for mesh communications. This master terminal mesh synchronization broadcast scheme may be configured to work for satellite 105 terminal 115 distance changes also.

Figure 21A:
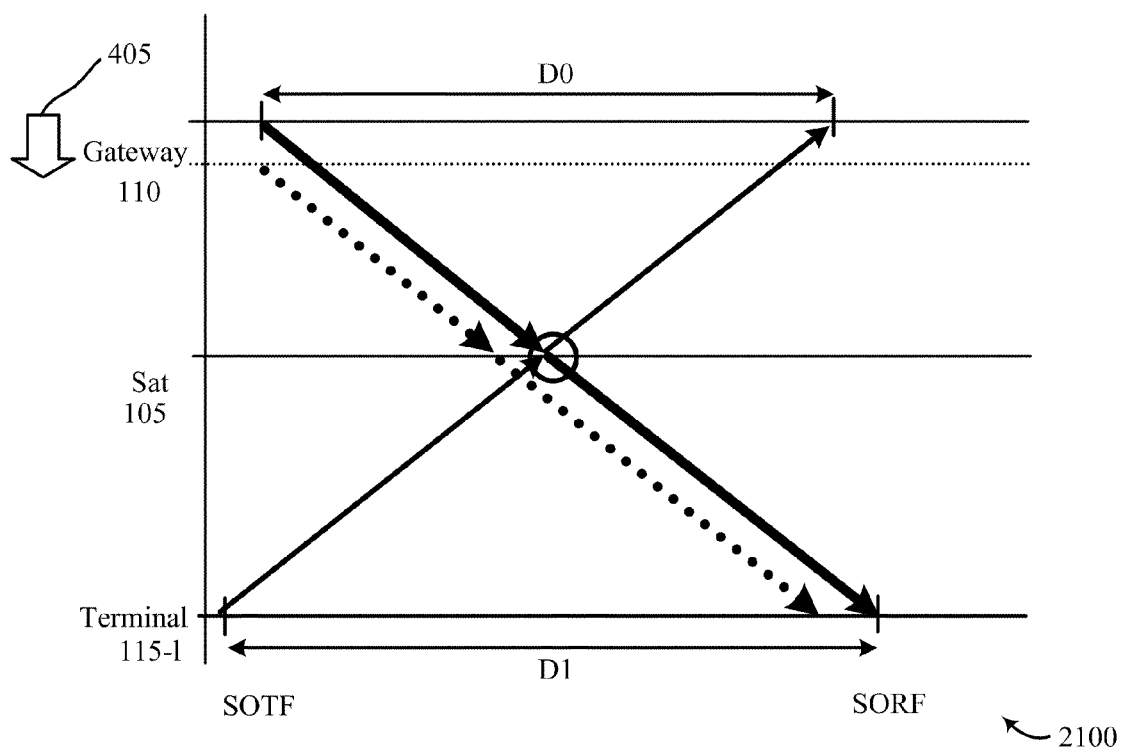

Referring next to FIG. 21A, a timing diagram 2100 illustrates issues that may arise for synchronization with mesh communications. Assume that the gateway 110 and satellite 105 move 405 closer together by d µs, while the distance between the satellite 105 and the terminal 115-$l$ do not change (as illustrated in FIG. 4A). In this instance, the gateway 110 signal arrives at terminal 115-$l$ d µs earlier. The travel time for a terminal 115-$l$ signal sent to itself via a mesh link would not change.

Figure 21B:
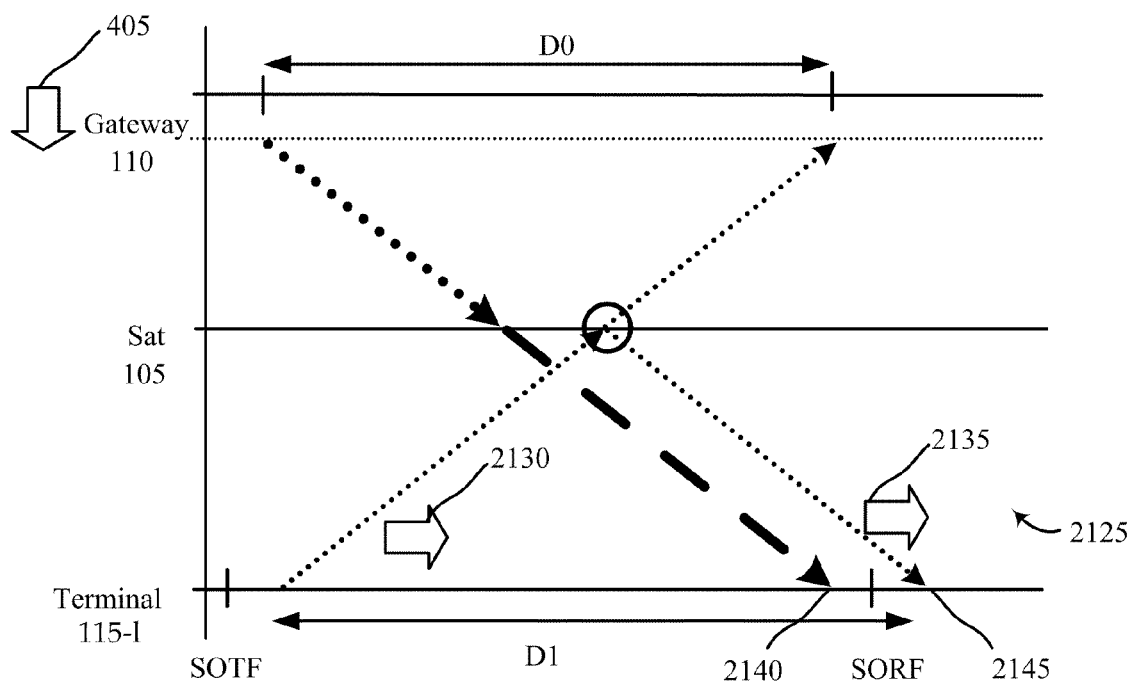

Continuing the discussion from FIG. 21A, and turning to FIG. 21B, a timing diagram 2125 illustrates how modified synchronization operations may avoid timing errors in some embodiments. In one embodiment, gateway 110 does not make any local adjustments to its SOTF or SORF timing. Gateway 110 measures the received timing of signals received from terminal 115-$l$, and sends control signals to direct terminal 115-$l$ to move its SOTF right 2130 by d µs. As directed, terminal 115-$l$ makes a correction (note, however, that in other embodiments, the correction 2130 may be based on other correction schemes). Terminal 115-$l$ moves its SOTF right 2130 by d µs.

Terminal 115-$l$ may then track SORF mesh timing based on arrival of its own burst. This burst may be a special, modified terminal to terminal burst, and not the gateway 110 signal. This burst is transmitted in accordance with the same timing as the terminal 115-$l$ SOTF timing for the return link (as modified). By way of example, the gateway 110 may arrange for each terminal 115 to send and receive its own sync bursts. The mesh terminals 115 may then adjust 2135 their SORF timing for mesh communications off their own burst. This differs from certain embodiments described above, where the mesh timing is achieved by synchronization with the downstream gateway transmissions. Note, therefore, that a terminal 115-$l$ may have two distinct SORF times: one 2140 for the downstream transmissions from the gateway 110 and one 2145 for mesh communications. This terminal self-sync scheme for mesh synchronization may be configured to work for satellite 105-terminal 115 distance changes also.

The control of the terminal broadcast sync described with reference to FIG. 20B and terminal self-sync described with reference to FIG. 21B may be undertaken by the gateway 110, a master terminal 115, another device or set of devices, or any combination thereof. It is also worth noting the synchronization and adjustments related to the terminal broadcast sync of FIG. 20B or self-sync may be performed by the terminal frame timing module 220 of FIG. 2, and be used in the system 100 of FIG. 1, to achieve the synchronization of burst mesh communications.

Figure 22:
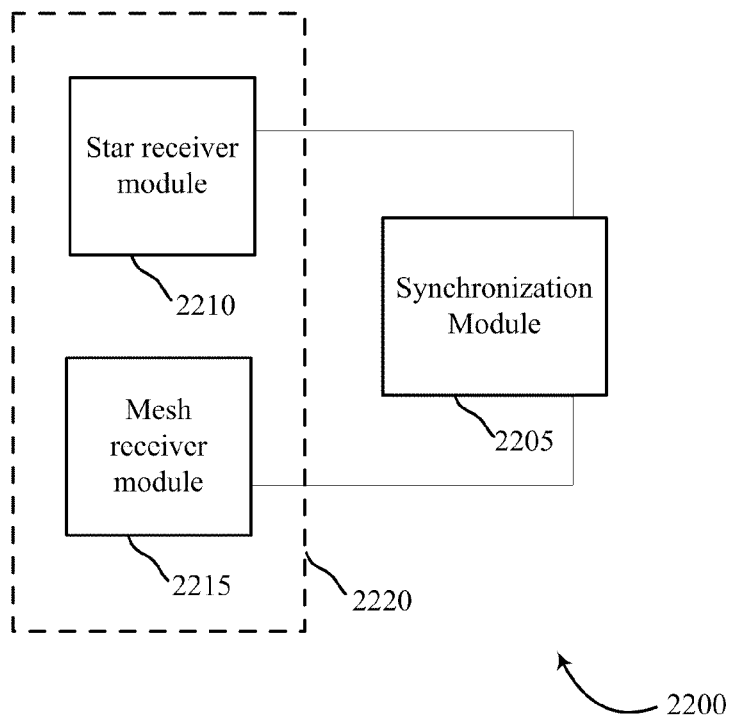

Turning to FIG. 22, a block diagram is shown illustrating an example configuration 2200 that may provide for synchronized mesh satellite communications according to various embodiments of the invention. This configuration 2200 includes a receiver 2220 and a synchronization module 2205, which may be implemented in the user terminal 115 of FIG. 1 or 2. These modules 2220 and 2205 may, therefore, be the terminal frame timing module 220, and RF frontend 230 in the terminal 115-$a$ of FIG. 2. The illustrated embodiment includes a star receiver module 2210 and a mesh receiver module 2215 which may together make up a portion of the receiver 2220. However, some or all of the functionality of the modules of configuration 2200 may be implemented in other devices or sets of devices.

The synchronization module 2205 may receive and use a first set of signals to identify first start of receive frame timing for communications received at the user terminal via satellite from a gateway. The first set of signals may be generated at and transmitted from the gateway, and be received by receiver 2220 and forwarded to the frame synchronization module 2205. The synchronization module 2205 may receive and use a second set of signals to identify a second start of receive frame timing for communications received at the user terminal via satellite from other user terminals. The second set of signals may be generated at and transmitted from a terminal (e.g., a master terminal sending a broadcast burst, or a user terminal that sends a burst to itself via satellite), and be received by receiver 2220 and forwarded to the synchronization module 2205.

As noted above, the receiver 2220 may include a star receiver module 2210 configured to receive communications from the gateway via satellite according to the first start of receive frame timing. Thus, the synchronization module 2205 may set the start of receive frame timing (using the first set of signals) for the star receiver module 2210 for communications from the gateway. The receiver 2220 may also include a mesh receiver module 2215 configured to receive communications from the other user terminals according to the second start of receive frame timing. The synchronization module 2205 may set the start of receive frame timing (using the second set of signals) for the mesh receiver module 2215 for communications from other terminals.

Figure 23:
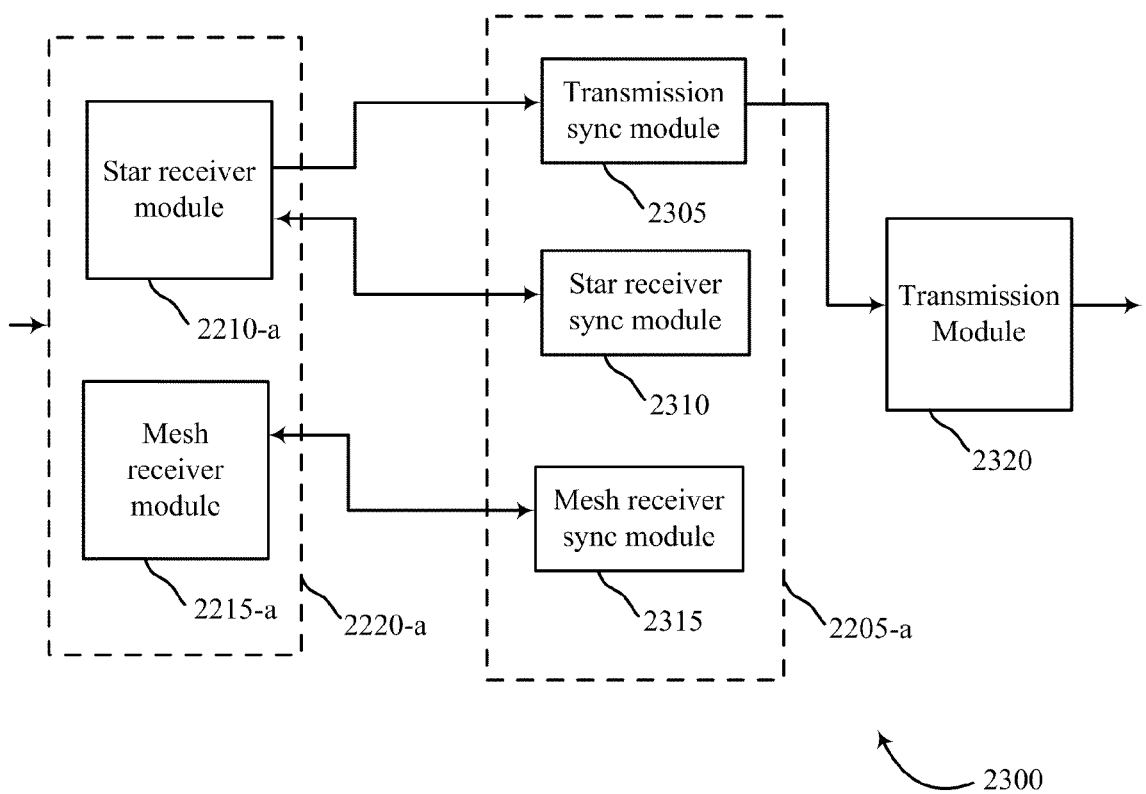
FIG. 23 is a block diagram illustrating an alternative configuration of components of one or more devices using terminal to terminal timing data for mesh synchronization in a satellite communications system according to various embodiments of the invention.

Turning to FIG. 23, a block diagram is shown illustrating an alternative example configuration 2300 that may provide for synchronized mesh satellite communications according to various embodiments of the invention. This configuration 2300 includes a receiver 2220-a, a synchronization module 2205-a, and a transmission module 2320, which may be implemented in the terminal 115 of FIG. 1 or 2. These modules 2220-a, 2205-a, and 2320 may, therefore, be the terminal frame timing module 220, and RF frontend 230 in the terminal 115-a of FIG. 2. The illustrated embodiment includes a star receiver module 2210-a and a mesh receiver module 2215-a which may together make up a portion of the receiver 2220-a. The illustrated embodiment also includes a transmission sync module 2305, star receiver sync module 2310, and mesh receiver sync module 2315 which may together make up a portion of the synchronization module 2205-a. However, some or all of the functionality of the modules may be implemented in other devices or sets of devices.

The star receiver sync module 2310 may receive and use a first set of signals to identify first start of receive frame timing for communications received at the user terminal via satellite from a gateway (e.g., via a star communications link). The first set of signals may be generated at and transmitted from the gateway, and may be received by the star receiver module 2210-a and forwarded to the star receiver sync module 2310. The mesh receiver sync module 2315 may receive and use a second set of signals to identify second start of receive frame timing for mesh communications received at the user terminal via satellite from other user terminals. The second set of signals may be generated at and transmitted from a terminal (e.g., a terminal sending a broadcast burst, or a user terminal that sends a burst to itself via satellite), and may be received by the mesh receiver module 2215-a and forwarded to the mesh receiver sync module 2315. The transmission sync module 2305 may receive and use a third set of signals to set the start of transmit frame timing for communications transmitted from the user terminal via satellite to either the gateway or other user terminals. The third set of signals may be generated at and transmitted from the gateway, and be received by the star receiver module 2210-a and forwarded to the transmission sync module 2305.

As noted above, the receiver 2220-a may include a star receiver module 2210-a configured to receive communications from the gateway via satellite. Thus, the star receiver sync module 2310 may set the start of receive frame timing (using the first set of signals) for the star receiver module 2210-a for communications from the gateway. The receiver 2220-a may also include a mesh receiver module 2215-a configured to receive communications from the other user terminals. Thus, the mesh receiver sync module 2315 may set the start of receive frame timing (using the second set of signals) for the mesh receiver module 2215-a for communications from other terminals. The transmission module 2320 may transmit both star communication signals (transmission to the gateway via satellite) and mesh communication signals (transmission directly to other user terminals via satellite). Thus, the transmission sync module 2305 may set the start of transmit frame timing (using the third set of signals) for the transmission module 2320. In one embodiment, the transmission module 2320 may send a terminal-to-terminal broadcast burst (e.g., the second set of signals) according to the start of transmit frame timing, the burst setting the start of receive frame timing for mesh communications at other terminals.

In some embodiments, the gateway may (but need not) maintain its start of receive frame and start of transmit frame settings, even in the face of a change in distance between the gateway and satellite. Assume that user terminals each implement the components of the configuration 2300 of FIG. 23. The gateway may transmit the first set of signals to the user terminals to adjust the start of receive frame settings at each user terminal for communications from the gateway (while the start of transmit frame settings at the gateway are maintained). The first set of signals (e.g., received via the star receiver module 2210-a) may set start of receive frame timing at the user terminal based on a reception time of the first set of signals at the user terminal. The gateway may also transmit the third set of signals to user terminals to adjust the start of transmit frame settings at the user terminal (while the start of receive frame settings at the gateway are maintained). The third set of signals (received via the star receiver module 2210-a) may adjust the start of transmit frame timing at the user terminal. The third set of signals may be generated and transmitted by the gateway in response to reception time at the gateway of signals transmitted from the transmission module 2320.

A user terminal implementing the components of FIG. 23 may use terminal to terminal bursts to set start of receive frame timing for mesh communications. Thus, the second set of signals (received via the mesh receiver module 2215-a) may set start of receive frame timing at the user terminal based on a reception time of the transmissions from the user terminal itself, or from another terminal (e.g., from a master terminal).

The modules illustrated in FIG. 22 and FIG. 23 may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 24:
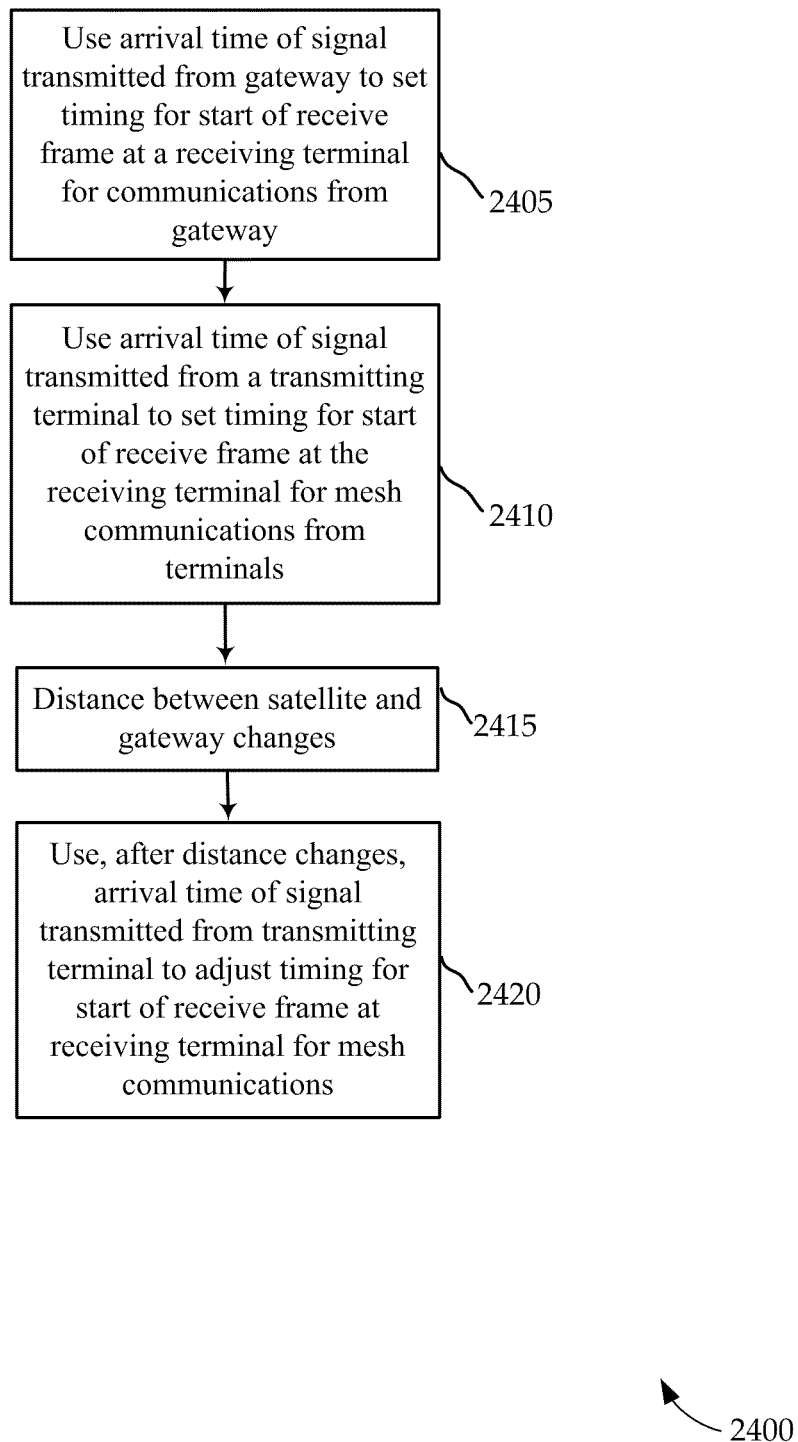
FIG. 24 is a flowchart illustrating a method of using terminal to terminal timing data to provide for synchronized mesh satellite communications according to various embodiments of the invention.

FIG. 24 is a flowchart illustrating a method 2400 of using terminal to terminal timing data to provide for synchronized mesh satellite communications according to various embodiments of the invention. The method 2400 may, for example, be performed within the system 100 of FIG. 1 or system 200 of FIG. 2.

At block 2405, the arrival time of a signal transmitted from the gateway is used to set the start of receive frame timing at a receiving terminal for communications from the gateway. At block 2410, the arrival time of a signal transmitted from a transmitting terminal (the receiving terminal may, but need not, be different from the transmitting terminal) is used to set the start of receive frame timing at the receiving terminal for mesh communications from the terminals. At block 2415, the distance between the satellite and the gateway changes. At block 2420, the arrival time of the signal transmitted from the transmitting terminal is used after the distance changes to adjust the timing for the start of receive frame at the receiving terminal for mesh communications.

Figure 25:
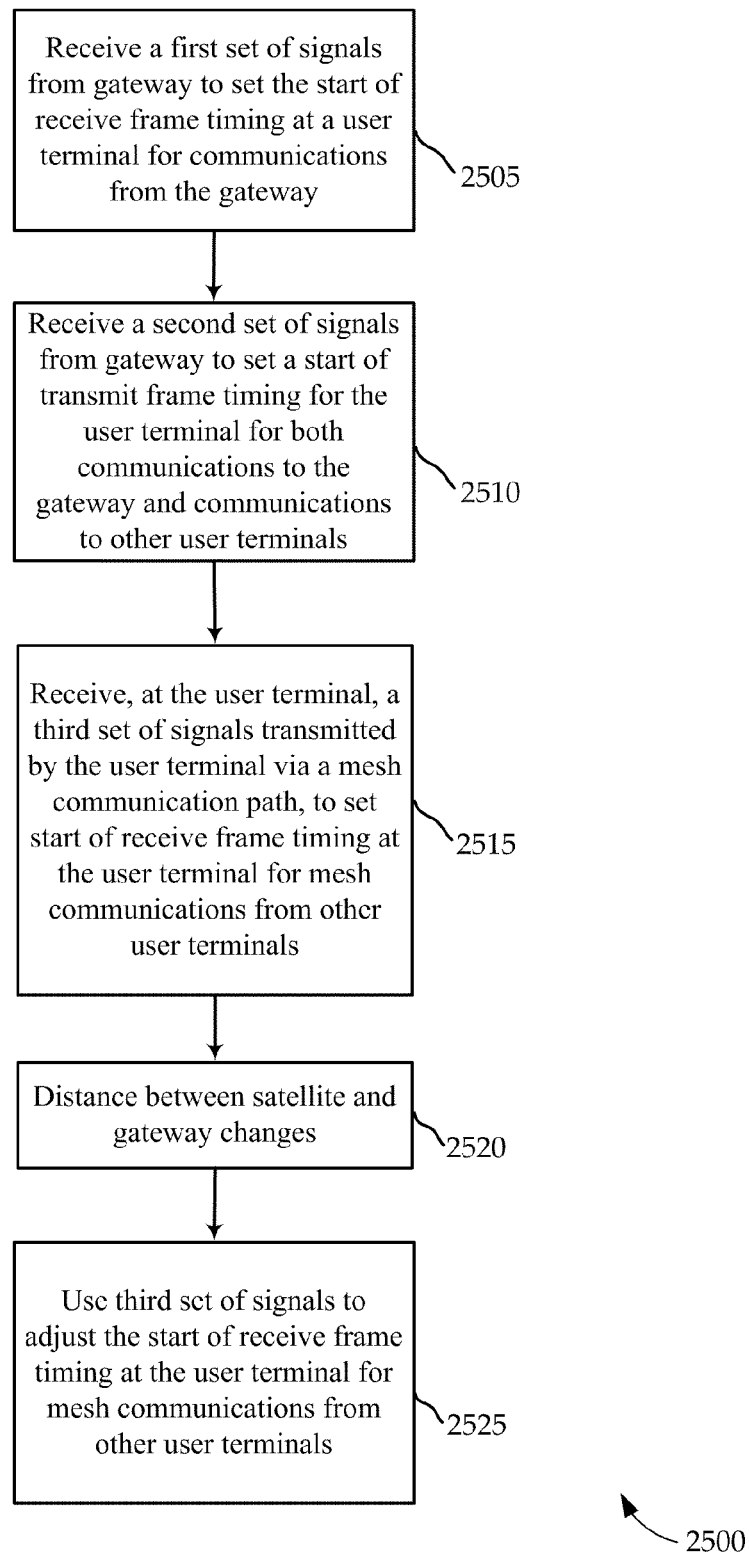
FIG. 25 is a flowchart illustrating a method of self-synchronization for a terminal for mesh satellite communications according to various embodiments of the invention.

FIG. 25 is a flowchart illustrating a method 2500 of self-synchronization for a terminal for mesh satellite communications according to various embodiments of the invention. The method 2500 may, for example, be performed within the system 100 of FIG. 1 or system 200 of FIG. 2. The method 2500 may also be performed by the terminal 115 of FIG. 1 or 2 or, more specifically, by the configuration 2200 illustrated in FIG. 22 or configuration 2300 illustrated in FIG. 23.

At block 2505, a first set of signals is received from the gateway to set the start of receive frame timing at a user terminal for communications from the gateway. At block 2510, a second set of signals is received from the gateway to set the start of transmit frame timing for the user terminal for both communications to the gateway and communications to other user terminals. At block 2515, a third set of signals transmitted by the user terminal via a mesh communication path is received at the user terminal to set the start of receive frame timing at the user terminal for mesh communications from other user terminals. At block 2520, the distance between the satellite and the gateway changes. At block 2525, the third set of signals is used to adjust the start of receive frame timing at the user terminal for mesh communications from other user terminals.

Figure 26:
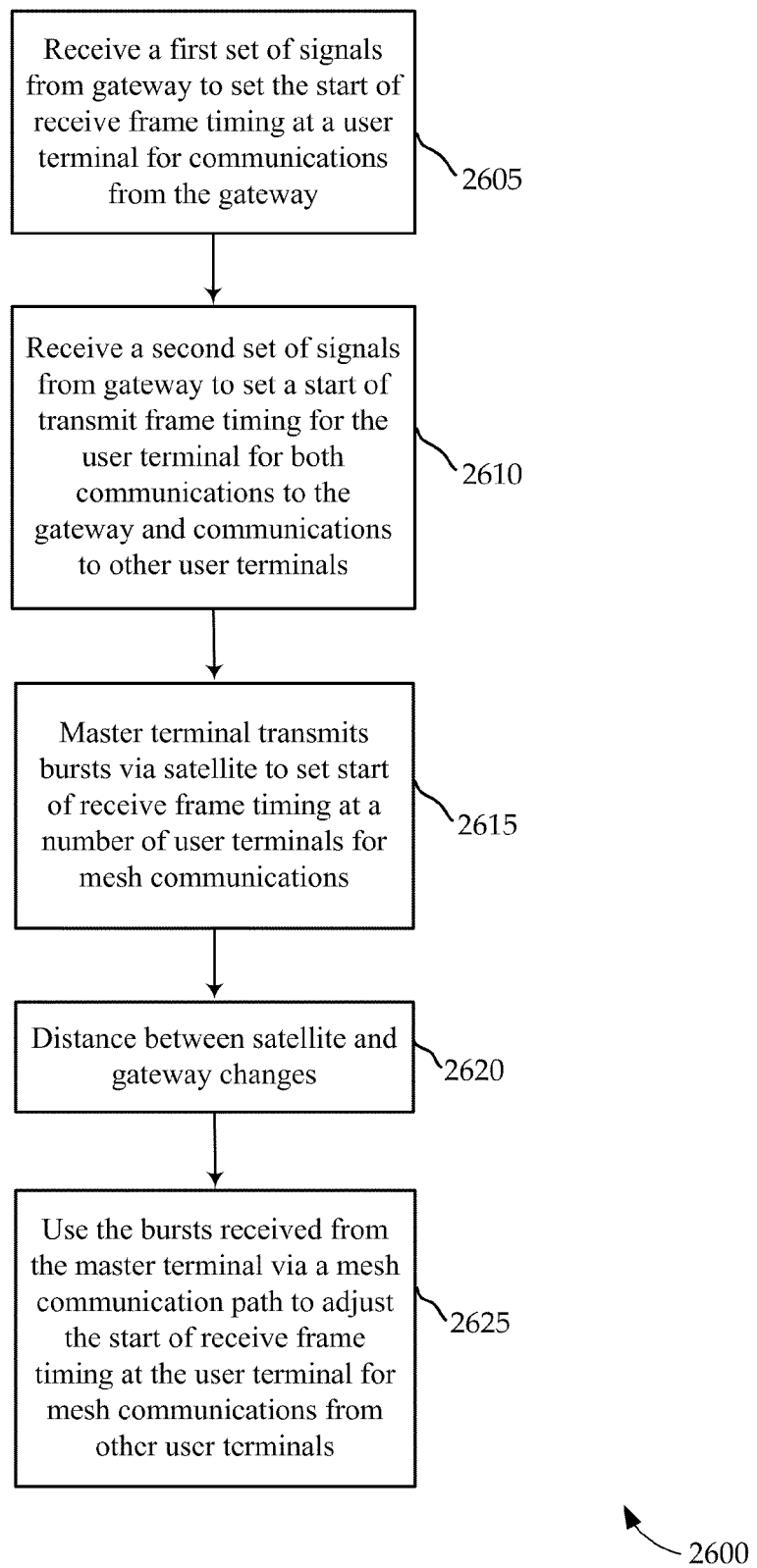
FIG. 26 is a flowchart illustrating a method of using a master terminal for synchronization for mesh satellite communications according to various embodiments of the invention.

FIG. 26 is a flowchart illustrating a method 2600 of using a master terminal for synchronization for mesh satellite communications according to various embodiments of the invention. The method 2600 may, for example, be performed within the system 100 of FIG. 1 or system 200 of FIG. 2. The method 2600 may also be performed by the terminal 115 of FIG. 1 or 2 or, more specifically, by the configuration 2200 illustrated in FIG. 22 or configuration 2300 illustrated in FIG. 23.

At block 2605, a first set of signals is received from the gateway to set the start of receive frame timing at a user terminal for communications from the gateway. At block 2610, a second set of signals is received from the gateway to set a start of transmit frame timing for the user terminal for both communications to the gateway and communications to other user terminals. At block 2615, a master terminal transmits bursts via a satellite to set the start of receive frame timing at a number of user terminals for mesh communications. At block 2620, the distance between the satellite and the gateway changes. At block 2625, the bursts received from the master terminal via a mesh communication path are used to adjust the start of receive frame timing at the user terminal for mesh communications from other user terminals.

Figure 27:
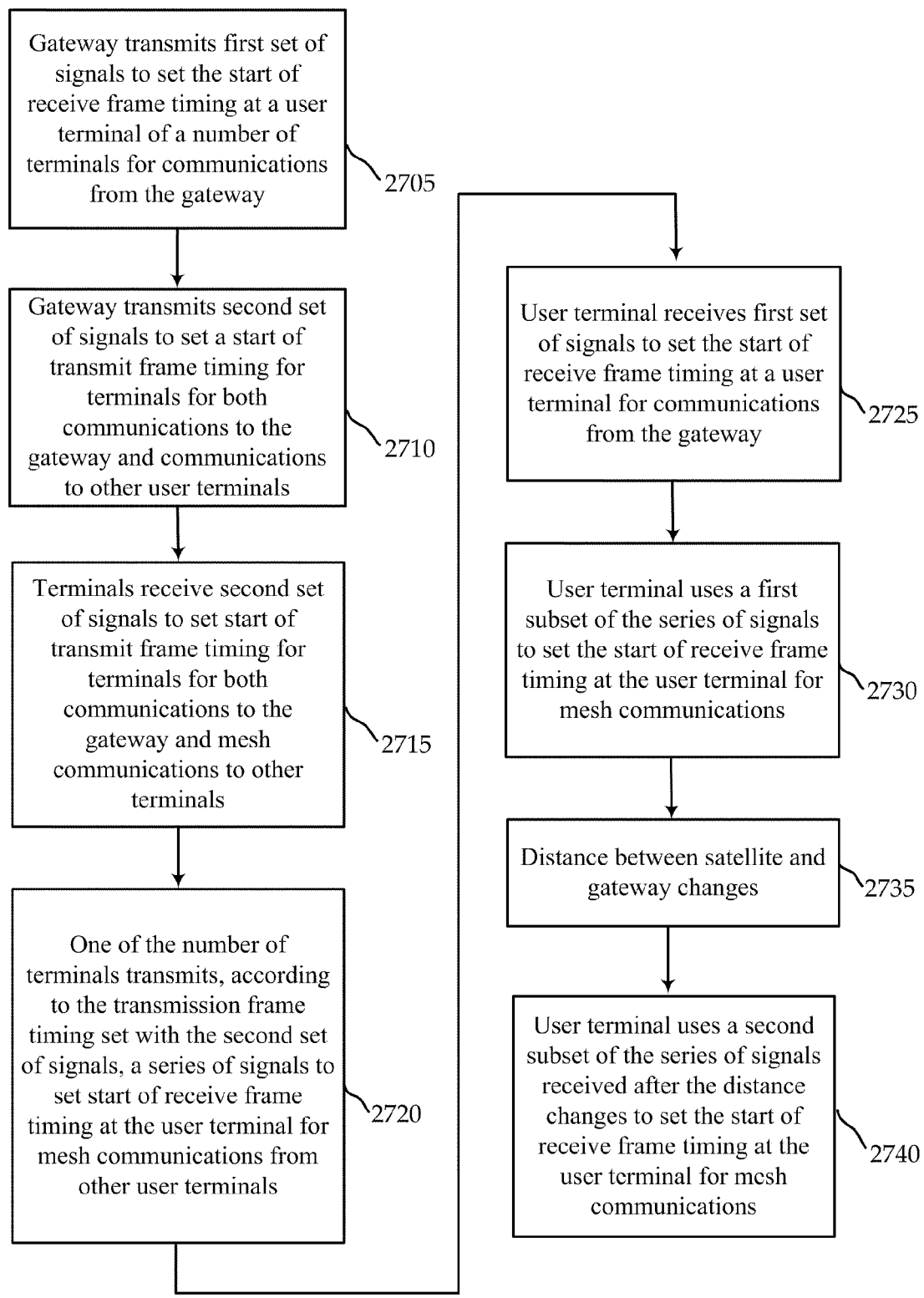
FIG. 27 is a flowchart illustrating a method of using timing for a mesh communication path for synchronizing a satellite communications system according to various embodiments of the invention.

FIG. 27 is a flowchart illustrating a method 2700 of using timing for a mesh communication path for synchronization for mesh satellite communications according to various embodiments of the invention. The method 2700 may, for example, be performed within the system 100 of FIG. 1 or system 200 of FIG. 2. The method 2700 may also be performed by the terminal 115 of FIG. 1 or 2 or, more specifically, by the configuration 2200 illustrated in FIG. 22 or configuration 2300 illustrated in FIG. 23.

At block 2705, the gateway transmits a first set of signals to set the start of receive frame timing at a user terminal of a number of terminals for communications from the gateway. At block 2710, the gateway transmits a second set of signals to set a start of transmit frame timing for terminals for both communications to the gateway and communications to other user terminals. At block 2715, the terminals receive the second set of signals to set the start of transmit frame timing for the terminals for both communications to the gateway and mesh communications to other user terminals. At block 2720, one of the number of terminals transmits, according to the transmission frame timing set with the second set of signals, a series of signals to set the start of receive frame timing at the user terminal for mesh communications from other user terminals.

At block 2725, a user terminal receives the first set of signals to set the start of receive frame timing at a user terminal for communications from the gateway. At block 2730, the user terminal uses a first subset of the series of signals to set the start of receive frame timing at the user terminal for mesh communications. At block 2735, the distance between the satellite and the gateway changes. At block 2740, a user terminal uses a second subset of the series of signals received after the distance changes to set the start of receive frame timing at the user terminal for mesh communications.

Conclusion

It is worth noting that the functional components of a gateway 110 (or gateway frame timing module 245), user terminal 115 (or terminal frame timing module 220), or satellite 105 discussed in FIGS. 1-27 may be implemented, in whole or in part, in hardware. Thus, they may each be made up of one, or more, Application Specific Integrated Circuits (ASICs) adapted to perform a subset of the applicable functions in hardware. Alternatively, the functions may be performed by one or more other processing modules (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. Each may also be implemented, in whole or in part, with instructions embodied in a memory, formatted to be executed by one or more general or application specific processors.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory module" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the inventions. For example, the above elements may merely be a component of a larger system, wherein other rules may take precedence over or otherwise modify the application of the inventions. Also, a number of steps may be undertaken before, during, or after the above elements are considered. Accordingly, the above description should not be taken as limiting the scope of the inventions.

What is claimed is:

1. A system for synchronizing timing for mesh satellite communications, the system comprising:
    a user terminal configured to:
        transmit one or more first signals to the satellite;
        receive the one or more first signals from the satellite via a mesh communication path; and
        transmit a time measurement identifying transmit time between the user terminal and the satellite; and
    a gateway, in communication with the user terminal via satellite, configured to:
        receive the time measurement identifying transmit time between the user terminal and the satellite;
        use the received time measurement to calculate a change in distance between the gateway and the satellite; and
        adjust, responsive to the change in distance between the gateway and the satellite, one or more signals of:
            a first set of control signals to set a start of receive frame for the user terminal; or
            a second set of control signals to set a start of transmit frame for the user terminal,
    the adjustment set to synchronize timing for mesh satellite communications.

2. The system of claim 1, wherein the time measurement comprises a round trip time for the one or more first signals from the user terminal to the satellite and back to the user terminal.

3. The system of claim 1, wherein to use the received time measurement to calculate the change in distance, the gateway is configured to:
    compare the received time measurement to a time measurement identifying a transmit time between the user terminal and the gateway.

4. The system of claim 3, wherein the gateway is further configured to:
    calculate the time measurement identifying the transmit time between the user terminal and the gateway based on a round trip time of one or more second signals from the gateway to the user terminal and back to the gateway.

5. The system of claim 3, wherein the user terminal is further configured to:
    transmit the time measurement identifying the transmit time between the user terminal and the gateway based on a transmit time of one or more second signals from the gateway to the user terminal.

6. The system of claim 1, wherein the gateway is configured to perform the adjustment by:
    adjusting one or more signals of the first set to signal the user terminal to adjust start of receive frame timing at the user terminal; and
    adjusting one or more signals of the second set to signal the user terminal to adjust start of transmit frame timing at the user terminal.

7. The system of claim 1, wherein the gateway is configured to perform the adjustment by:
    delaying a transmission time for one or more signals of the first set,
    wherein the received time measurement is used to determine that the distance between the satellite and the gateway decreased by a first amount, while the distance between the satellite and the user terminal decreased by a second amount less than the first amount.

8. The system of claim 1, wherein the gateway is configured to adjust the transmission timing to synchronize arrival, at the satellite, of the first set of signals and a third set of signals transmitted from the user terminal, the timing of the third set of signals set by the user terminal in response to receipt of the second set of signals.

9. The system of claim 1, wherein the gateway is configured to adjust the transmission timing to synchronize arrival, at the satellite, of the first set of signals and a third set of signals transmitted from the user terminal and a plurality of additional user terminals.

10. The system of claim 1, wherein,
    the calculated change in distance between the gateway and the satellite comprises a change in one way trip time between the gateway and the satellite; or
    the calculated change in distance between the gateway and the satellite comprises calculating the distance between the gateway and the satellite.

11. A gateway for synchronizing timing for mesh satellite communications, the gateway comprising:
    a memory module configured to:
        store a first time measurement corresponding to a transmit time between a user terminal and a satellite;
        store a second time measurement corresponding to a transmit time between the gateway and the user terminal via the satellite;
    a distance determination module, communicatively coupled with the memory module, configured to calculate a change in distance between the gateway and the satellite based at least in part on the first and second timing measurements;
    a synchronization module, communicatively coupled with the location determination module, and configured to adjust, responsive to the change in distance between the gateway and the satellite, one or more signals of:
        a first set of control signals to set a start of receive frame for the user terminal; or
        a second set of control signals to set a start of transmit frame for the user terminal,
    the adjustment set to synchronize timing for mesh satellite communications; and
    a transmission module, communicatively coupled with the synchronization module, and configured to transmit the one or more signals with the adjusted transmission timing.

12. The gateway of claim 11, further comprising a receiver module, communicatively coupled with the memory module, and configured to:
    receive, from the user terminal, the first time measurement corresponding to the transmit time between the user terminal and the satellite, the first time measurement calculated by the user terminal.

13. The gateway of claim 12, wherein the user terminal generates the first time measurement by calculating a round trip time for one or more signals from the user terminal to the satellite and back to the user terminal.

14. The gateway of claim 11, wherein the memory module is further configured to:

store additional time measurements, received from a plurality of additional user terminals, corresponding to the transmit time between at least a subset of the plurality of additional user terminals and the satellite, wherein the additional time measurements are used by the distance determination module to calculate the change in distance between the gateway and the satellite.

15. The gateway of claim 11, wherein the distance determination module is further configured to:

calculate the change in distance between the gateway and the satellite by comparing the first and second timing measurements.

16. The gateway of claim 11, wherein the gateway further comprises a timing measurement module, communicatively coupled with the memory module, and configured to:

calculate the second time measurement identifying the transmit time between the user terminal and the gateway based on a round trip time of one or more signals from the gateway to the user terminal and back to the gateway.

17. The gateway of claim 11, further comprising a receiver module, communicatively coupled with the memory module, and configured to:

receive the second time measurement identifying the transmit time between the user terminal and the gateway based on a transmit time of one or more signals from the gateway to the user terminal.

18. The gateway of claim 11, wherein the synchronization module is configured to adjust the transmission timing to synchronize arrival, at the satellite, of the first set of signals and a third set of signals transmitted from the user terminal.

19. A method for synchronizing timing for mesh satellite communications, the method comprising:

obtaining a time measurement of a transmit time corresponding to a first distance between a user terminal and a satellite, the time measurement calculated based on a terminal-to-terminal communication on a mesh communication path;

identifying data corresponding to a second distance between a gateway and the user terminal;

using the time measurement and the data to calculate a change in distance between the gateway and the satellite; and adjusting, responsive to the change in distance between the gateway and the satellite, timing for one or more signals of:

a first set of control signals to set a start of receive frame for the user terminal; or a second set of control signals to set a start of transmit frame for the user terminal, the adjustment set to synchronize timing for mesh satellite communications.

20. The method of claim 19, further comprising:
receiving, from the user terminal, the time measurement.

21. The method of claim 19, further comprising:
receiving and storing additional data, received from each of a plurality of additional user terminals, corresponding to the transmit time between at least a subset of the plurality of additional user terminals and the satellite, wherein the additional data is used to calculate the change in distance between the gateway and the satellite.

22. The method of claim 19, further comprising:
calculating the data based on a round trip time of one or more signals from the gateway to the user terminal and back to the gateway; or receiving the data from the user terminal.

23. A device for synchronizing timing for mesh satellite communications, the device comprising:

means for storing a first timing measurement identifying transmit time between a gateway and a user terminal communicating via satellite;

means for storing a second timing measurement identifying transmit time between the user terminal and the satellite;

means for identifying a change in distance between the gateway and the satellite based at least in part on the first and second timing measurements; and means for adjusting, responsive to the change in distance between the gateway and the satellite, one or more signals of:

a first set of control signals to set a start of receive frame for the user terminal; or a second set of control signals to set a start of transmit frame for the user terminal, the adjustment set to synchronize timing for mesh satellite communications.

* * * * *